(12) United States Patent
Kim et al.

(10) Patent No.: US 12,546,521 B2
(45) Date of Patent: Feb. 10, 2026

(54) SHOE CARE APPARATUS AND CONTROL METHOD THEREFOR

(71) Applicant: SAMSUNG ELECTRONICS CO., LTD., Suwon-si (KR)

(72) Inventors: Minsoo Kim, Suwon-si (KR); Joongwon Na, Suwon-si (KR); Heemoon Jeong, Suwon-si (KR); Kookjeong Seo, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 188 days.

(21) Appl. No.: 18/372,464

(22) Filed: Sep. 25, 2023

(65) Prior Publication Data

US 2024/0011691 A1 Jan. 11, 2024

Related U.S. Application Data

(63) Continuation of application No. PCT/KR2022/007461, filed on May 26, 2022.

(30) Foreign Application Priority Data

Jun. 2, 2021 (KR) .......................... 10-2021-0071780

(51) Int. Cl.
*F25B 49/02* (2006.01)
*A47B 81/00* (2006.01)
(Continued)

(52) U.S. Cl.
CPC ............ *F25B 49/025* (2013.01); *A47B 81/00* (2013.01); *A47L 23/205* (2013.01); *A61L 9/20* (2013.01);
(Continued)

(58) Field of Classification Search
CPC .... A47B 81/00; A47L 23/205; A61L 2209/11; F25B 49/02; F25B 49/022; F25B 49/025; F25B 2600/02; F25B 2700/2104
See application file for complete search history.

(56) References Cited

U.S. PATENT DOCUMENTS

| | | | | |
|---|---|---|---|---|
| 4,467,617 A | * | 8/1984 | Morgan, Jr. | ............ G07F 9/105 62/158 |
| 5,950,439 A | * | 9/1999 | Peterson | ................. F25B 49/02 417/22 |

(Continued)

FOREIGN PATENT DOCUMENTS

| | | |
|---|---|---|
| CN | 111513476 A | 8/2020 |
| EP | 2 733 257 A1 | 5/2014 |

(Continued)

OTHER PUBLICATIONS

Communication issued Nov. 28, 2024 by the European Patent Office in European Patent Application No. 22816382.0.

(Continued)

*Primary Examiner* — Jonathan Bradford
(74) *Attorney, Agent, or Firm* — Sughrue Mion, PLLC

(57) ABSTRACT

A shoe care apparatus includes a chamber for accommodating shoes; a heat pump device including a condenser for heating air to be supplied to the chamber, and a compressor for discharging a coolant to the condenser; a fan for supplying the heated air to the chamber; a temperature sensor for acquiring the temperature of the air to be supplied to the chamber; and a controller. The controller performs a synchronous operation mode controlling the compressor and the fan to operate together, based on receipt of a signal from the temperature sensor, and performs an asynchronous operation mode in which the fan is operated without operating the compressor in response to a predetermined time period (Continued)

having elapsed after the stop of the operation of the compressor.

20 Claims, 15 Drawing Sheets

(51) Int. Cl.
    *A47L 23/20*     (2006.01)
    *A61L 9/20*     (2006.01)
    *F25B 30/02*     (2006.01)

(52) U.S. Cl.
    CPC .......... *F25B 30/02* (2013.01); *A61L 2209/11* (2013.01); *F25B 2700/21161* (2013.01); *F25B 2700/21174* (2013.01)

(56) References Cited

U.S. PATENT DOCUMENTS

| | | | |
|---|---|---|---|
| 9,417,009 | B2 | 8/2016 | Heo et al. |
| 9,669,123 | B2* | 6/2017 | Levsen ............... A61L 2/202 |
| 10,119,221 | B2 | 11/2018 | Nam et al. |
| 11,492,750 | B2 | 11/2022 | Kim et al. |
| 11,535,975 | B2 | 12/2022 | Jung et al. |
| 2004/0098992 | A1* | 5/2004 | Lee ..................... F24F 13/24 62/157 |
| 2005/0005621 | A1* | 1/2005 | Jayadev ............ G05D 23/1923 236/46 R |
| 2010/0132130 | A1* | 6/2010 | Moon ................... D06F 58/10 68/12.27 |
| 2019/0330790 | A1 | 10/2019 | Ko et al. |
| 2021/0047773 | A1 | 2/2021 | Kim et al. |
| 2021/0093743 | A1 | 4/2021 | Kim et al. |

FOREIGN PATENT DOCUMENTS

| | | |
|---|---|---|
| EP | 3 757 278 B1 | 11/2022 |
| JP | 8-189760 A | 7/1996 |
| JP | 6486197 B2 | 3/2019 |
| JP | 6571478 B2 | 9/2019 |
| KR | 10-2006-0039512 A | 5/2006 |
| KR | 10-1306714 B1 | 9/2013 |
| KR | 10-2016-0111685 A | 9/2016 |
| KR | 10-2017-0057760 A | 5/2017 |
| KR | 10-2018-0057313 A | 5/2018 |
| KR | 10-2018-0065313 A | 6/2018 |
| KR | 10-1943360 B1 | 4/2019 |
| KR | 10-2019-0127439 A | 11/2019 |
| KR | 10-2021-0001769 A | 1/2021 |
| KR | 10-2021-0009694 A | 1/2021 |
| KR | 10-2021-0016968 A | 2/2021 |
| KR | 10-2021-0020763 A | 2/2021 |
| KR | 10-2021-0038161 A | 4/2021 |

OTHER PUBLICATIONS

Communication dated Sep. 22, 2022, issued by the International Searching Authority in counterpart International Application No. PCT/KR2022/007461 (PCT/ISA/210).

Communication dated Sep. 22, 2022, issued by the International Searching Authority in counterpart International Application No. PCT/KR2022/007461 (PCT/ISA/237).

Communication dated Jul. 31, 2025, issued by the European Patent Office in European Application No. 22 816 382.0.

\* cited by examiner

SHOE CARE APPARATUS AND CONTROL METHOD THEREFOR

CROSS-REFERENCE TO RELATED APPLICATIONS

This application is a bypass continuation application of International Patent Application No. PCT/KR2022/007461, filed on May 26, 2022, which is based on and claims priority to Korean Patent Application No. 10-2021-0071780, filed on Jun. 2, 2021 with the Korean Intellectual Property Office, the disclosures of each of which are incorporated by reference herein in their entireties.

BACKGROUND

1. Field

The disclosure relates to a shoe care apparatus capable of maintaining a constant temperature of air supplied into a chamber.

2. Description of Related Art

Clothes treating apparatuses use a heat pump cycle to keep the air in the chamber circulating while performing functions such as drying and deodorizing clothes.

Recently, in addition to such clothes treating apparatuses, shoe care apparatuses using a heat pump cycle have been developed. A shoe care apparatus is equipped with a sterilizer and a deodorizer as well as a drying function, thereby simultaneously dehumidifying, deodorizing, and sterilizing shoes which are more vulnerable to hygiene than clothing.

SUMMARY

In accordance with certain embodiments of the present disclosure, a shoe care apparatus includes a chamber configured to accommodate shoes; a heat pump device including a condenser configured to heat air supplied to the chamber and a compressor configured to discharge a refrigerant to the condenser; a fan configured to supply the heated air to the chamber; a temperature sensor configured to obtain a temperature of the air supplied to the chamber; and a controller. The controller is configured to perform a synchronous operation mode for controlling the compressor and the fan to operate together, based on receipt of a first signal from the temperature sensor, by controlling the fan to operate, controlling the compressor to operate in response to a predetermined first time period having elapsed after a start of operation of the fan, and controlling the compressor to stop operating based on receipt of a second signal from the temperature sensor; after performing the synchronous operation mode, control the fan to stop operating in response to a predetermined second time period having elapsed after a stop of an operation of the compressor; and perform an asynchronous operation mode for controlling the fan to operate without operating the compressor, by controlling the fan to operate in response to a predetermined third time period having elapsed after the stop of the operation of the compressor.

The predetermined first time period may be substantially equal to the predetermined second time period.

The second time period may be shorter than the predetermined third time period.

The controller may be further configured to resume the synchronous operation mode based on receipt of the first signal from the temperature sensor while the asynchronous operation mode is performed.

The predetermined first time period may be different from the predetermined second time period, and the predetermined second time period may be shorter than the predetermined third time period.

The predetermined first time period may be substantially equal to the predetermined second time period, and the predetermined second time period may be shorter than the predetermined third time period.

The shoe care apparatus may further include an control input device configured to receive a shoe care course input from a user for setting a shoe care course. The controller may be further configured to execute the shoe care course by performing each of the synchronous operation mode and the asynchronous operation mode, in response to receipt of the shoe care course input.

The controller may be configured to complete execution of the shoe care course after performing the asynchronous operation mode for a duration of a predetermined fourth time period. The predetermined fourth time period may be shorter than the predetermined third time period.

The shoe care apparatus may further include a deodorizer configured to remove an odor from air discharged from the chamber. The controller may be further configured to control the deodorizer to operate in response to performance of the asynchronous operation mode.

The deodorizer may include a light source configured to emit ultraviolet light.

The shoe care apparatus may further include a sterilizer configured to sterilize air discharged from the chamber. The controller may be further configured to control the sterilizer to operate in response to performance of the asynchronous operation mode.

The sterilizer may include a xenon lamp.

The shoe care apparatus may further include a holder detachably mounted on the chamber. The heated air may be supplied to the chamber via the holder.

The holder may include a support body, at least one support frame protruding from the support body and configured to hold a shoe, a coupler configured to connect to an air inlet of the chamber and to guide the heated air from the air inlet to the at least one support frame through the support body, and at least one nozzle formed on a bottom surface of the at least one support frame and configured to supply the heated air to the chamber.

The controller may be further configured to perform the asynchronous operation mode after performing the synchronous operation mode.

The first signal may indicate the temperature of the air to be substantially equal to or less than a predetermined minimum temperature, and the second signal may indicate the temperature of the air to be substantially equal to or greater than a predetermined target temperature.

In accordance with certain embodiments of the present disclosure, a shoe care apparatus includes a chamber configured to accommodate shoes; a heat pump device including a compressor, an evaporator, and a condenser; a fan configured to supply air, heated by the condenser, to the chamber; an air temperature sensor configured to detect a temperature of the air supplied to the chamber; a refrigerant temperature sensor disposed on an inlet of a refrigerant pipe and configured to detect a temperature of a refrigerant supplied to the evaporator by the refrigerant pipe; and a controller. The controller is configured to perform a synchronous operation mode for controlling the compressor and the fan to operate together, based on receipt of a first signal from the air temperature sensor, by controlling the fan to operate, controlling the compressor to operate in response to a predetermined first time period having elapsed after a start of operation of the fan, and controlling the compressor to stop operating based on receipt of a second signal received from the air temperature sensor; control the fan to stop operating in response to a predetermined second time period having elapsed after performing the synchronous operation mode; and perform an asynchronous operation mode for controlling the fan to operate without operating the compressor, by controlling the fan to operate for a predetermined third time period based on a third signal received from the refrigerant temperature sensor.

The first signal may indicate the temperature of the air to be substantially equal to or less than a predetermined minimum temperature, the second signal may indicate the temperature of the air to be substantially equal to or greater than a predetermined target temperature, and the third signal may indicate the temperature of the refrigerant to be substantially equal to or less than a predetermined reference temperature.

In accordance with certain embodiments of the present disclosure, a shoe care apparatus includes a chamber configured to accommodate shoes; a heat pump device including a condenser configured to heat air supplied to the chamber and a compressor configured to discharge a refrigerant to the condenser; a fan configured to supply the heated air to the chamber; an air temperature sensor configured to measure a temperature of the air supplied to the chamber; and a controller. The controller is configured to receive an air temperature signal from the air temperature sensor indicating a current air temperature measurement value; perform a synchronous operation mode by periodically controlling the fan to operate, controlling the compressor to operate after the fan starts operating, controlling the compressor to stop operating, and controlling the fan to stop operating after the compressor stops operating; based on a comparison of the current air temperature measurement value and a predetermined target temperature value, stop performance of the synchronous operation mode; in response to a predetermined time period having elapsed after the compressor stops operating, perform an asynchronous operation mode by controlling the fan to operate without operating the compressor; and based on a comparison of the current air temperature measurement value and a predetermined minimum temperature value, stop performance of the asynchronous operation mode and resume performance of the synchronous operation mode.

The shoe care apparatus may further include a refrigerant temperature sensor configured to measure a temperature of the refrigerant. The controller may be further configured to receive a refrigerant temperature signal from the refrigerant temperature sensor indicating a current refrigerant temperature measurement value; and, based on a comparison of the current refrigerant temperature measurement value and a predetermined reference temperature value, stop performance of the synchronous operation mode and perform the asynchronous operation mode.

According to an aspect of the disclosure, the shoe care apparatus can maintain a constant temperature inside a chamber to prevent damage to shoes.

Also, according to an aspect of the disclosure, the shoe care apparatus can efficiently care for shoes while reducing power consumption of the shoe care apparatus.

Also, according to an aspect of the disclosure, the shoe care apparatus can reduce noise and protect a heat pump device.

Also, according to an aspect of the disclosure, the shoe care apparatus can prevent overheating caused by the heat pump device, thereby protecting shoes and components of the shoe care apparatus.

BRIEF DESCRIPTION OF THE DRAWINGS

The above and other aspects and features of certain embodiments of the present disclosure will be more apparent from the following description taken in conjunction with the accompanying drawings, in which.

DETAILED DESCRIPTION

Figure 1:
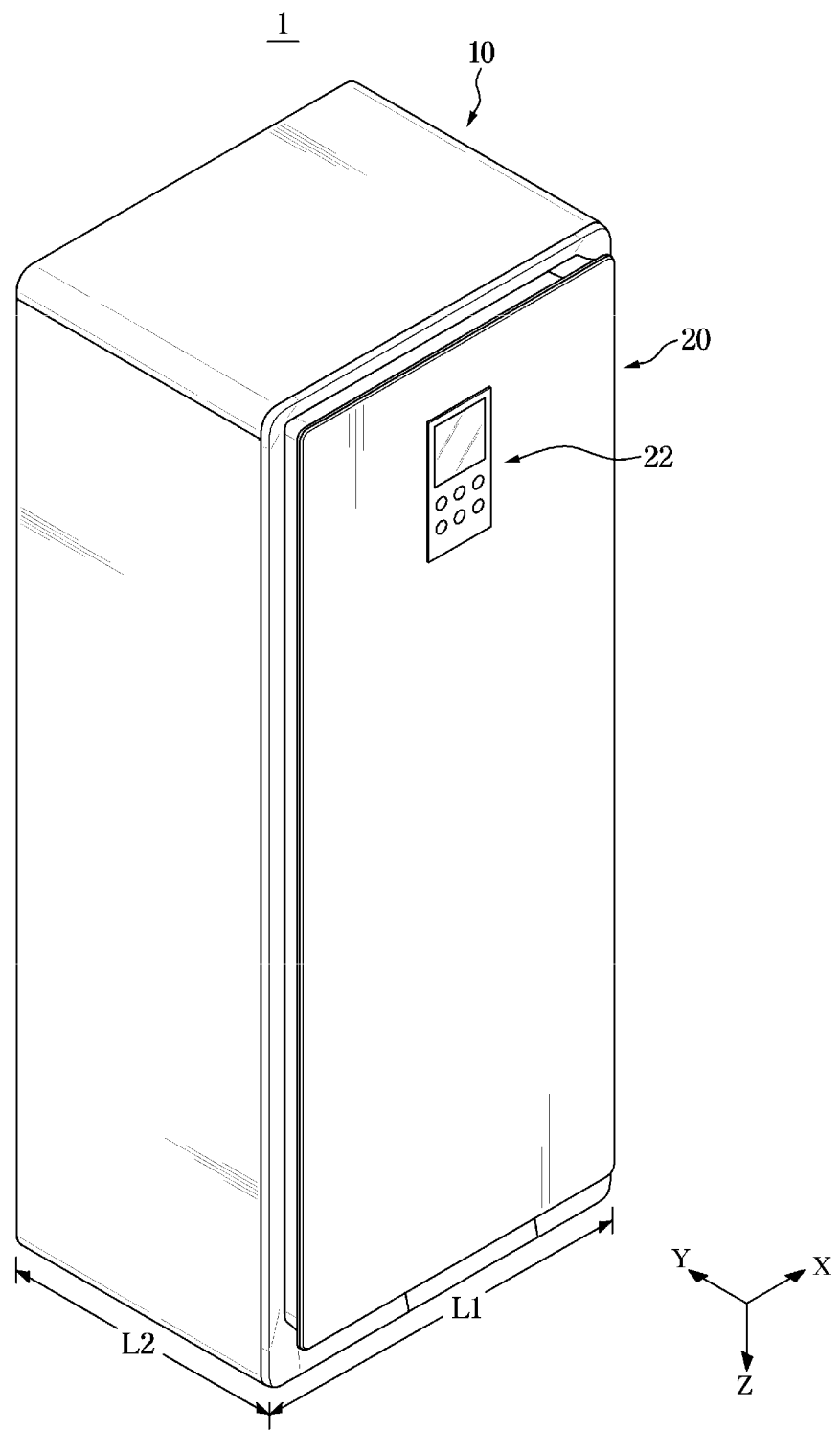
FIG. 1 is a perspective view illustrating a shoe care apparatus, according to an embodiment of the disclosure.

Like reference numerals throughout the disclosure denote like elements. Also, this disclosure does not describe all the elements according to embodiments of the disclosure, and descriptions well-known in the art to which the disclosure pertains or overlapped portions are omitted. The terms such as "part", "—member", "module", "—block", and the like may refer to at least one process processed by at least one hardware or software. According to embodiments, a plurality of "—part", "—member", "—module", "—block" may be embodied as a single element, or a single of "—part", "—member", "—module", "—block" may include a plurality of elements.

It will be understood that when an element is referred to as being "connected" to another element, it can be directly or indirectly connected to the other element, wherein the indirect connection includes "connection" via a wireless communication network.

It will be understood that the terms "include" and "comprise", when used in this disclosure, specify the presence of stated elements, but do not preclude the presence or addition of one or more other elements.

It will be understood that when it is stated in this disclosure that a member is located "on" another member, this does not exclude embodiments where still another member is present between the two members.

It will be understood that the term "substantially equal", when used in this disclosure to compare two quantities, indicates that the described quantities are equal within a margin of error such that the difference between the quantities does not significantly affect the disclosed outcome. Those of skill in the art will be able to determine the appropriate margin of error for each pair of quantities from their context in the disclosure.

It will be understood that, although the terms first, second, etc. may be used herein to describe various elements, these elements should not be limited by these terms.

It is to be understood that the singular forms are intended to include the plural forms as well, unless the context clearly dictates otherwise.

Reference numerals used for method steps and operations are used for convenience of explanation, but not to limit an order of the operations. Thus, unless the context clearly dictates otherwise, an order of operations different from the provided order may be practiced.

Hereinafter, embodiments of the disclosure will be described in detail with reference to the accompanying drawings. A dryer or shoe care apparatus 1, according to the disclosure, may be used to dry and/or care for clothing, footwear, sundries, and the like.

Unlike clothing, shoes are typically made of leather, rubber, adhesives, and the like, and are more susceptible to heat than clothing. Accordingly, a shoe care apparatus to treat shoes at a constant temperature, which is a lower temperature than a clothing care apparatus, is proposed.

Figure 2:
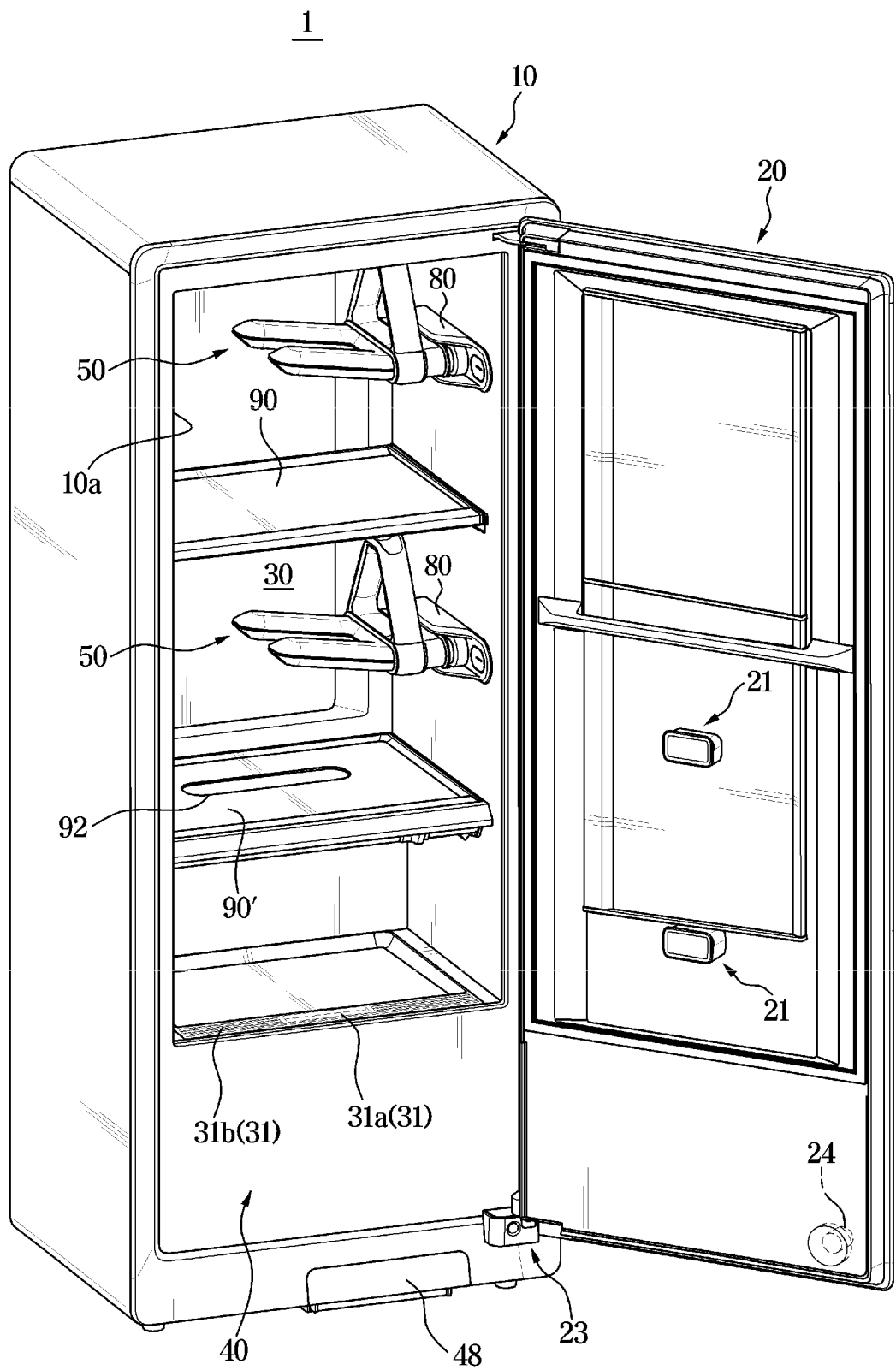
FIG. 2 is a perspective view illustrating a shoe care apparatus with an open door, according to an embodiment of the disclosure.
Figure 3:
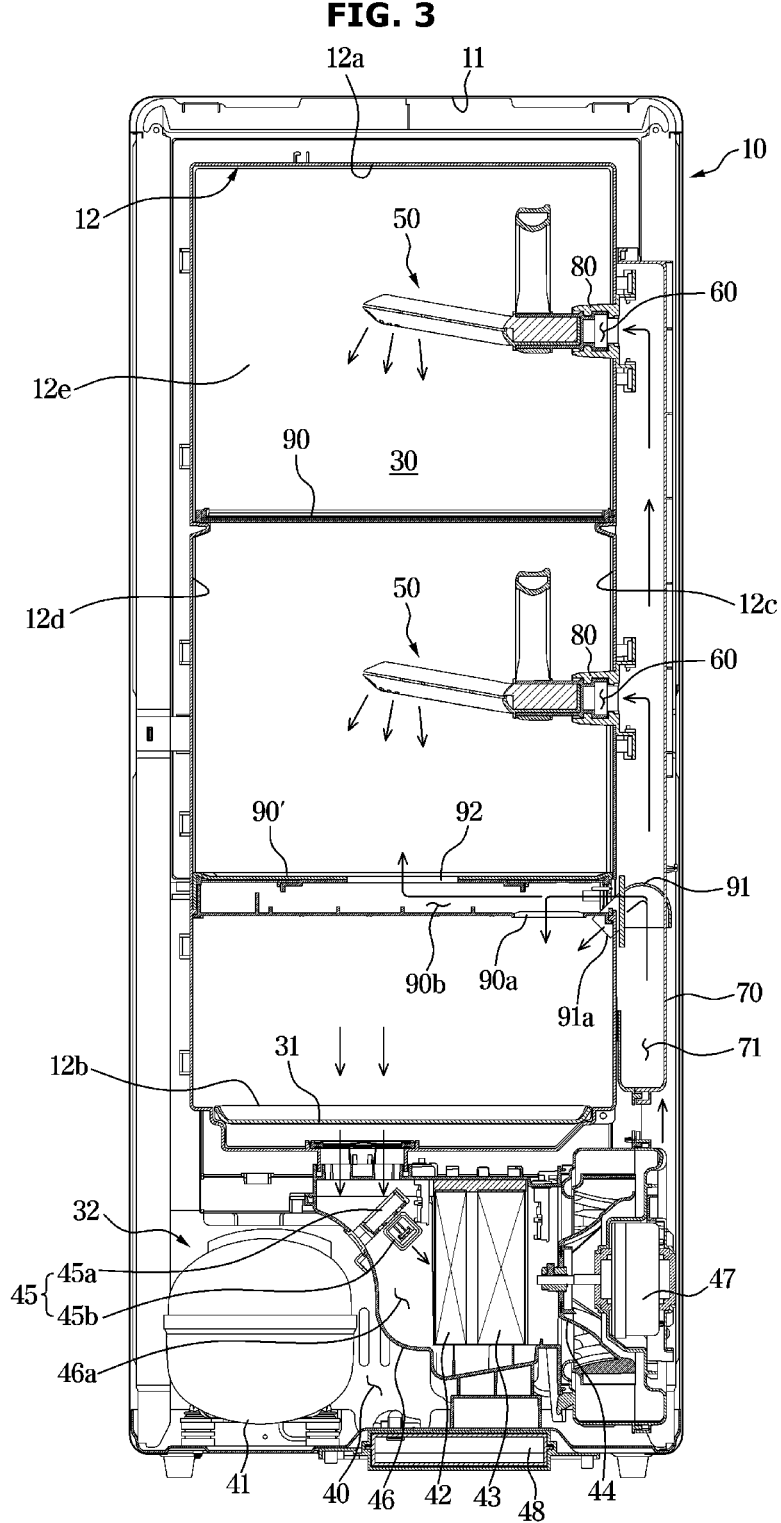
FIG. 3 is a cross-sectional front view illustrating a shoe care apparatus, according to an embodiment of the disclosure.

FIG. 1 is a perspective view illustrating a shoe care apparatus, according to an embodiment of the disclosure. FIG. 2 is a perspective view illustrating a shoe care apparatus with an open door, according to an embodiment of the disclosure. FIG. 3 is a cross-sectional front view illustrating a shoe care apparatus, according to an embodiment of the disclosure.

Referring to FIG. 1, a shoe care apparatus 1 may include a main body 10 forming an exterior appearance, and a door 20 rotatably coupled to the main body 10.

As shown in FIG. 1 and FIG. 2, a side in which a door 20 of a shoe care apparatus 1 is installed is defined as a front or a front side, and based on the above, rear, left and right sides and top and bottom sides may also be defined.

The main body 10 may be provided in a rectangular shape with an open front side. An opening 10a may be formed on the open front side of the main body 10. The door 20 may be rotatably coupled to the main body 10 to open and close the open front side of the main body 10. The door 20 may be coupled to the main body 10 by a hinge 23.

The main body 10 may be formed such that a front length L1 extending in a first direction X is different from a side length L2 extending in a second direction Y. That is, the front surface of the main body 10 may be formed in length L1 longer than a length L2 of the side surface of the main body 10. Such a configuration enables the shoe care apparatus 1 to be easily installed even in a narrow entrance hall.

The length of the front surface of the main body 10 may be defined as the first length L1 and the length of the side surface of the main body 10 may be defined as the second length L2.

The door 20 may include a control input device such as a control panel 22 arranged on a front or top surface of the door 20. The control panel 22 may receive various commands from a user. In addition, the control panel 22 may display various information relating to an operation of the shoe care apparatus 1. For example, the user may use the control panel 22 to select a type of shoes to be cared for, and to set a suitable care course for the shoes. Details of the shoe types and care courses are described in FIG. 8.

The control panel 22 may include a display for displaying information about operations of the shoe care apparatus 1. In addition, the control panel 22 may include at least one of a button or a touch screen.

Referring to FIG. 2, the door 20 may include a hanging member 21. The hanging member 21 may be arranged on one side of the door 20 facing the interior of a chamber 30 defined within the main body 10. At least one hanging member 21 may be provided. The hanging member 21 may be used for hanging a handle 55 of a holder 50, which will be further detailed herein. The hanging member 21 may facilitate storage of the holder 50. The hanging member 21 may be used for other purposes.

Referring to FIG. 3, the main body 10 may include an outer case 11 and an inner case 12 disposed inside the outer case 11. The inner case 12 may form the chamber 30. The holder on which shoes may be held may be provided inside the chamber 30. The inner case 12 may be referred to as a case.

The chamber 30 may form a space in which shoes are accommodated. The chamber may be defined by a top surface 12a, a bottom surface 12b, a left surface 12c, a right surface 12d, and a rear surface 12e of the inner case 12.

The holder 50 and an installation rail 80 may be arranged in the chamber 30. The holder 50 and the installation rail 80 may be installed on the left surface 12c of the chamber 30 (as shown in FIGS. 2 and 3) or the right surface 12d of the chamber 30. That is, the holder 50 may be installed to show a side of the shoes when viewed from the front of the shoe care apparatus 1. To this end, the side surface of the main body 10 may be formed in a length shorter than a length of the front surface of the main body 10. However, positions of the holder 50 and the installation rail are not limited thereto.

At least one holder 50 may be provided. The holder 50 may be provided in a shape to be inserted into the shoes. In addition, the holder 50 may be detachable from the chamber 30. That is, the holder 50 may be coupled to the installation rail 80 arranged on the side surface of the chamber 30 and may be detachable from the installation rail 80. For example, the holder 50 may be inserted into the installation rail 80 along the second direction Y. In embodiments where the holder 50 is provided detachably, a space in the chamber 30 may be efficiently used depending on a size of the shoes.

The chamber 30 may include an air inlet 60 and an air outlet 31. The air inlet 60 may be formed on a sidewall of the inner case 12. For example, the air inlet 60 may be formed on the left surface 12c of the chamber 30. A plurality of air inlets 60 may be provided. Air heated by a condenser 43 may be supplied into the chamber 30 through the air inlet 60. The air inlet 60 may be formed in various shapes. For example, a shape of the air inlet 60 may be circular, rectangular, or polygonal.

The air outlet 31 may be arranged on the bottom surface 12b of the chamber 30. For example, the air outlet 31 may be disposed at a front side of the bottom surface 12b. Air in the chamber 30 may flow to a first duct 46 through the air outlet 31. The air outlet 31 may be comprised of a central hole 31a and a grille 31b including a plurality of side holes.

A machine room 32 may be arranged under the chamber 30. In the machine room 32, a compressor 41, an evaporator 42, the condenser 43, an expansion device 44, a deodorizer 45, the first duct 46, a fan 47, a first temperature sensor 110, and a second temperature sensor 120 may be provided (first and second temperature sensors 110, 120 not depicted in FIGS. 2 and 3). In addition, a sterilizer 49 (not depicted in FIGS. 2 and 3) may be arranged in the chamber 30 or in the machine room 32.

The compressor 41, the evaporator 42, the condenser 43, and the expansion device 44 may be collectively defined as a heat pump device 40. The heat pump device 40 may dehumidify and heat air circulating through the chamber 30. The heat pump device 40 may supply heated air into the chamber 30.

Also, the machine room 32 may be further provided with a third temperature sensor 130 arranged on an inlet side of the evaporator 42, a fourth temperature sensor 140 arranged on an outlet side of the compressor 41, and a current sensor 150 that measures a compressor current applied to the compressor 41 (sensors 130, 140, 150 not depicted in FIGS. 2 and 3).

The first duct 46 may be a duct positioned under the chamber 30 and may be referred to as a lower duct. The first duct 46 may be connected to the air outlet 31 to form a first flow path 46a that guides the air having passed the air outlet 31 to the fan 47. Also, the first duct 46 may be connected to a second duct 70 arranged within a side of the main body 10. The second duct 70 may be referred to as a upper duct.

The second duct 70 may be provided outside of a sidewall of the inner case 12 in the second direction Y of the shoe care apparatus 1. One end of the second duct 70 may be connected to at least one air inlet 60, and the other end may be connected to the first duct 46. The second duct 70 may form a second flow path 71 that guides air to the air inlet 60.

The evaporator 42 and the condenser 43 may be disposed in the first duct 46. The evaporator 42, the condenser 43 and the fan 47 may be arranged in the first direction X. The evaporator 42 may be located upstream of the air flow than the condenser 43.

The fan 47 may be provided between the heat pump device 40 and the chamber 30 to circulate air. The fan 47 may rotate based on a predetermined revolutions per minute (RPM). Specifically, the fan 47 may intake air brought into the first duct 46 and discharge the air to the second duct 70. The air brought into the first duct 46 through the air outlet 31 may be dried while passing the evaporator 42 of the heat pump device 40, heated while passing the condenser 43, and then discharged back to the chamber 30 through the second duct 70 and the air inlet 60.

The fan 47 may include a motor (not shown) and a blade (not shown). The blade may be rotated by motion of the motor, and the rotation of the blade may cause air to flow. The fan 47 may be of various shapes. For example, the fan 47 may be provided as a centrifugal fan.

In addition, the deodorizer 45 may be disposed in the first duct 46. The deodorizer 45 may include a deodorizing filter 45a and ultraviolet light emitting diode (UV LED, 45b). The deodorizing filter 45a and the UV LED 45b may be disposed adjacent to the air outlet 31 of the chamber 30. The UV LED 45b may irradiate light to the deodorizing filter 45a to remove odors from the air. For example, the deodorizing filter 45a may include at least one of a ceramic filter, a photocatalytic filter, or an activated carbon filter.

The sterilizer 49 may be further disposed in the chamber 30 or in the first duct 46. The sterilizer 49 may remove germs contained in the air. The sterilizer 49 may include at least one of an ultraviolet lamp, an ultraviolet LED, a xenon lamp, an ozone generator or a sterilizing spray.

A drain tub 48 may be disposed in a lower portion of the main body 10, i.e. underneath the machine room 32. The drain tub 48 may store condensate water produced by the evaporator 42. The drain tub 48 may be detachable from the main body 10.

At least one shelf 90 may be arranged in the chamber 30. Shoes may be placed on the shelf 90. In addition, at least one shelf 90 may be a duct shelf 90'. The duct shelf 90' may form a flow path 90b therein and may include a hole 90a at a lower surface thereof. Air rising from the fan 47 through the second duct 70 may be discharged into the chamber 30 through the hole 90a of the duct shelf 90'. In addition, the duct shelf 90' may be formed with a hole 92 at a top surface thereof.

A side surface of the duct shelf 90' may be connected to a circular duct 91 disposed in the second duct 70. Air may be discharged into the chamber 30 through a nozzle 91a of the circular duct 91. Air may be supplied to the duct shelf 90' after passing the circular duct 91. The circular duct 91 may have various shapes. For example, the circular duct 91 may have a fan shape.

The first temperature sensor 110 may measure a first temperature of air heated by the condenser 43. Hereinafter, a temperature of the air measured by the first temperature sensor 110 is defined as the first temperature. The first temperature sensor 110 may be arranged in a flow path between the condenser 43 and the fan 47. A controller 200 (not depicted in FIGS. 2 and 3) of the shoe care apparatus 1 may control an operation frequency of the compressor 41 based on the first temperature measured by the first temperature sensor 110.

The second temperature sensor 120 may measure a temperature of air at the air outlet 31 of the chamber 30. The second temperature sensor 120 may be disposed in a flow path between the air outlet 31 and the deodorizing filter 45a, or between the deodorizing filter 45a and the evaporator 42. A temperature of the air measured by the second temperature sensor 120 is hereinafter defined as the second temperature. The controller 200 of the shoe care apparatus 1 may determine an outside air temperature based on the second temperature measured by the second temperature sensor 120 at a start of operation of the shoe care apparatus 1.

Figure 4:
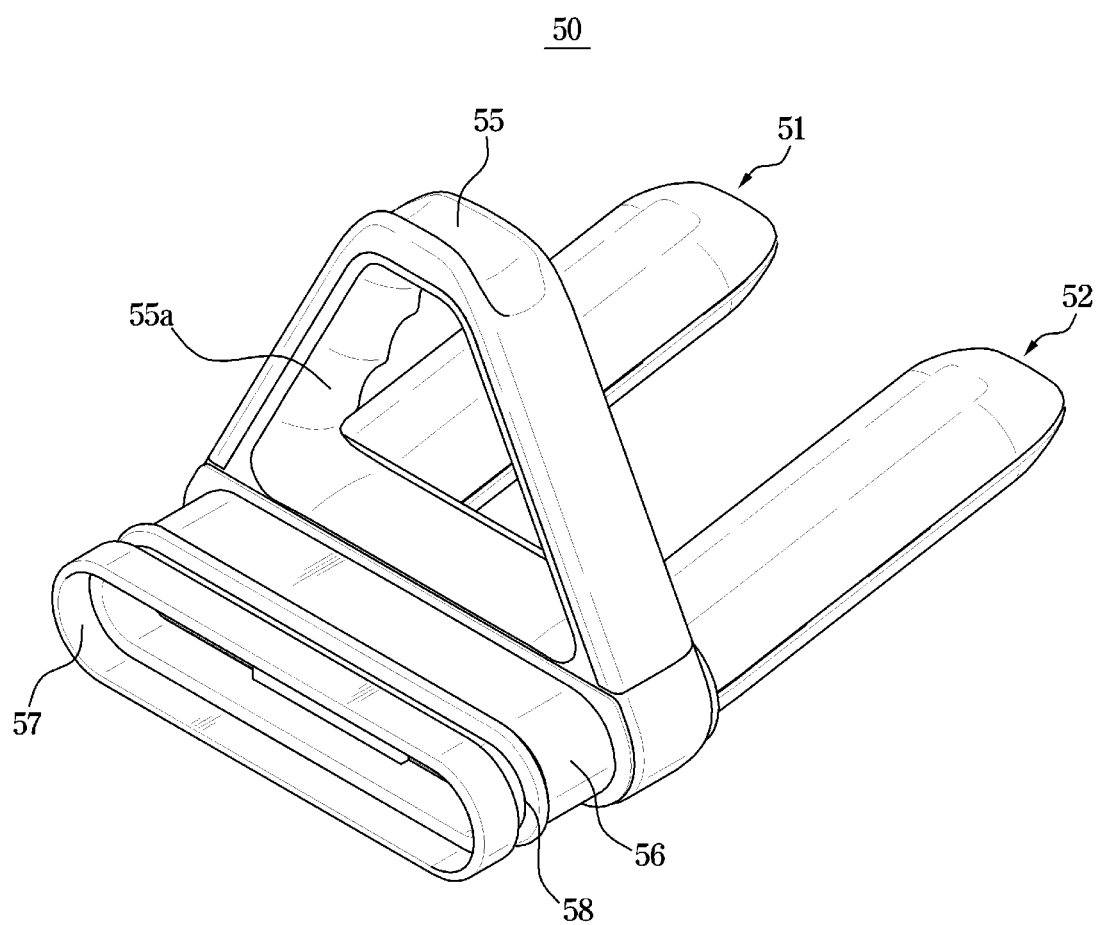
FIG. 4 and FIG. 5 are perspective views illustrating a holder of a shoe care apparatus, according to an embodiment of the disclosure.
Figure 5:
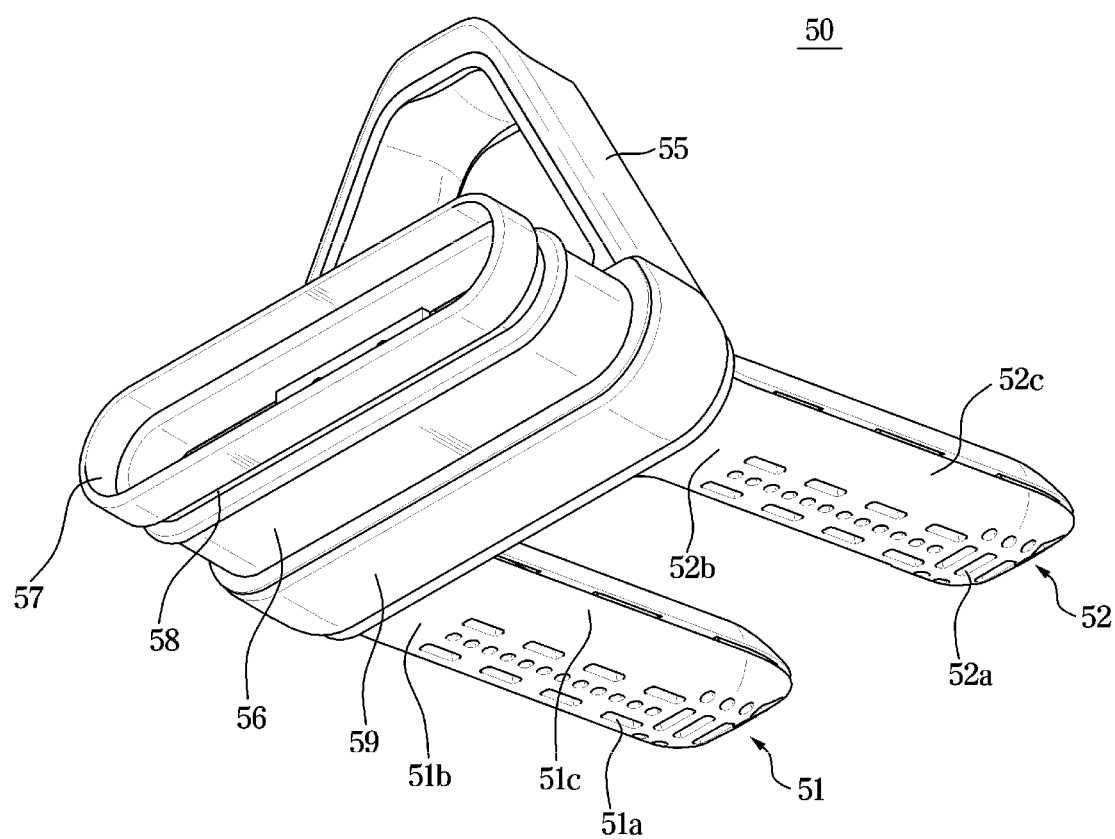

FIG. 4 and FIG. 5 are perspective views illustrating a holder of a shoe care apparatus, according to an embodiment of the disclosure.

Referring to FIG. 4 and FIG. 5, the holder 50 may include support frames 51 and 52, the handle 55, a support body 56, and a coupler 57. The support body 56 may connect the handle 55, the coupler 57, and the support frames 51 and 52.

The support frames 51 and 52 may include the first support frame 51 and the second support frame 52. The first support frame 51 and the second support frame 52 may protrude from a side surface of the chamber 30 in the first direction X and may be spaced apart from each other in the second direction Y. Although two support frames 51 and 52 are shown, one or more than two support frames may be provided. In embodiments where the first support frame 51 and the second support frame 52 are spaced apart from each other in the second direction Y, a plurality of shoes may be held thereon.

The support frames 51 and 52 may be inclined at a predetermined angle to prevent the shoes caught from falling out. That is, the support frames 51 and 52 may be inclined upwardly with respect to the bottom surface 12b of the chamber 30. Accordingly, the shoes caught by the holder 50 may be prevented from falling out.

The handle 55 may facilitate moving or detaching the holder 50. A user may move the holder 50 by gripping the handle 55. In addition, the user may easily mount the holder 50 on the installation rail 80 using the handle 55. The handle 55 may be of various shapes. For example, the handle 55 may be provided in a triangular shape. In addition, a grip member 55a may be formed on the handle 55. The user may easily grip the handle 55 using the grip member 55a.

The coupler 57 may be connected to the air inlet 60 and guide the air supplied through the second duct 70 to the support frames 51 and 52. The coupler 57 is shown in FIGS. 4 and 5 as having a hollow oval shape, but is not limited thereto and may be provided in various shapes.

Referring to FIG. 5, the support frames 51 and 52 of the holder 50 may include nozzles 51a and 52a, respectively. The first support frame 51 may include the first nozzle 51a and the second support frame 52 may include the second nozzle 52a. The nozzles 51a and 52a may be formed on at least one of bottom surfaces 51b and 52b or side surfaces 51c and 52c of the support frame. The nozzles 51a and 52a may be provided in various shapes. For example, the nozzles 51a and 52a may be circular, elliptical or rectangular. Heated air may be supplied to the chamber 30 through the nozzles 51a and 52a.

The holder 50 may further include a fastening groove 58. A fixing projection 84 of the installation rail 80 may be inserted into the fastening groove 58 to fix the holder 50. The holder 50 may further include a reinforcing member 59. The reinforcing member 59 may be connected to the handle 55 to reinforce the support body 56.

Figure 6:
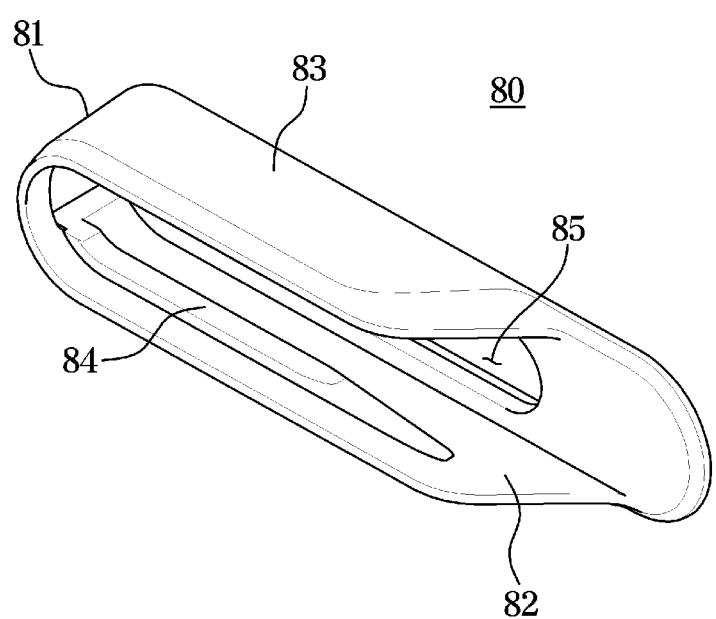
FIG. 6 is a perspective view illustrating an installation rail installed in a chamber of a shoe care apparatus, according to an embodiment of the disclosure.

FIG. 6 is a perspective view illustrating an installation rail installed in a chamber of a shoe care apparatus, according to an embodiment of the disclosure.

Referring to FIG. 6, one end 81 of the installation rail 80 may be closed to prevent the holder 50 from falling out, and the other end 82 of the installation rail 80 may have an open form so that the holder 50 may be inserted therein. The installation rail 80 may include a fixing frame 83 and a fixing projection 84.

The fixing frame 83 may extend from the one end 81 of the installation rail 80 to the other end 82 and may receive the coupler 57 of the holder 50. The fixing projection 84 may be inserted into the fastening groove 58 of the holder 50. The holder 50 may thus be fixed to the installation rail 80. The holder 50 may be detachable from the installation rail 80.

Also, the installation rail 80 may include an air hole 85. Air brought in through the second duct 70 and the air inlet 60 of the chamber 30 may be supplied to the holder 50 through the air hole 85 in the installation rail 80. That is, air brought in from the air inlet 60 may be supplied to the support frames 51 and 52 of the holder 50 through the air hole 85, and may be sprayed into the chamber 30 through the nozzles 51a and 52a.

Figure 7:
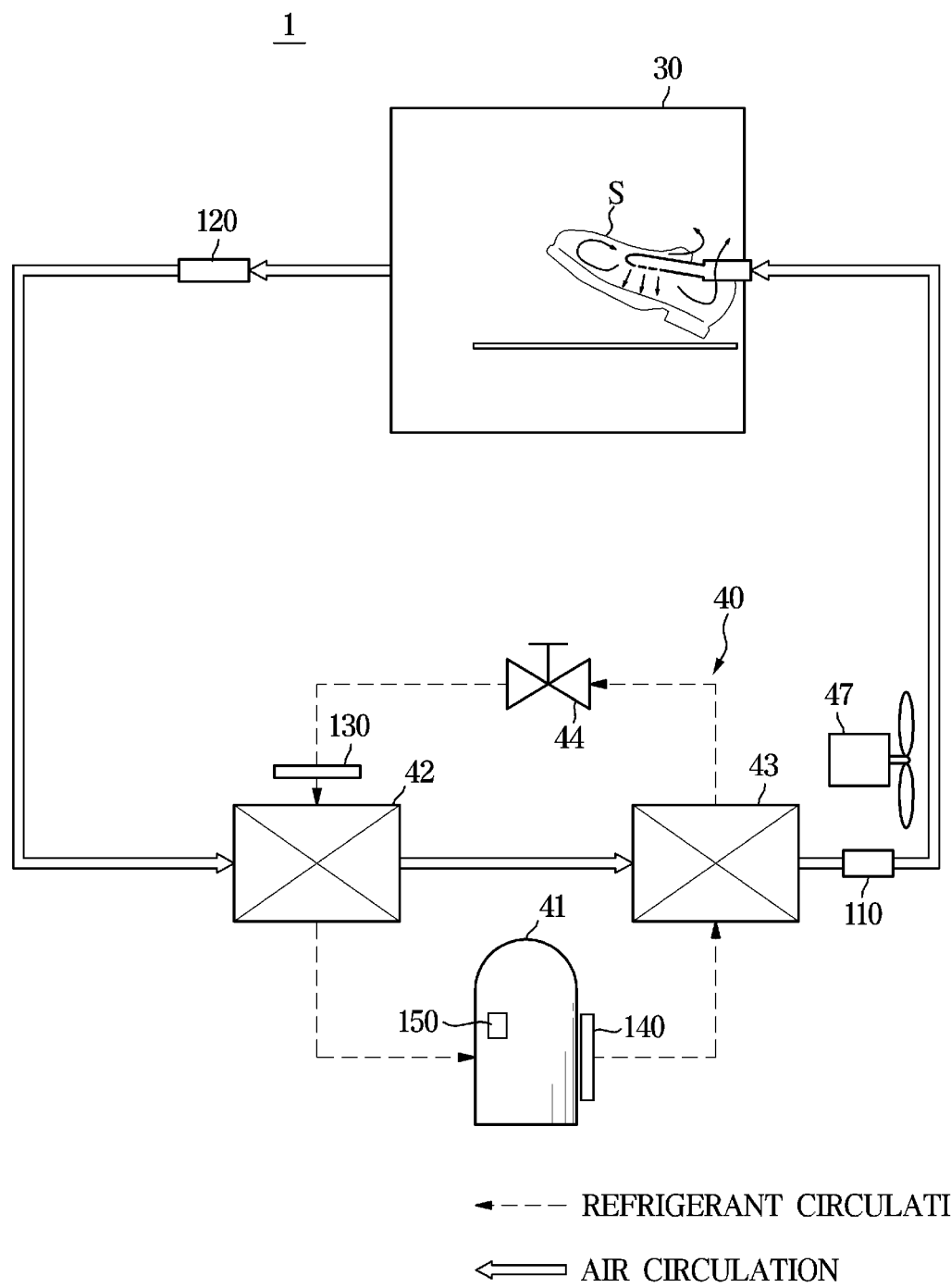
FIG. 7 is a schematic diagram illustrating a flow of air and refrigerant in a shoe care apparatus, according to an embodiment of the disclosure.

FIG. 7 is a schematic diagram illustrating a flow of air and refrigerant in a shoe care apparatus, according to an embodiment of the disclosure.

Referring to FIG. 7, the shoe care apparatus 1 according to an embodiment may include the chamber 30 for receiving an object S (for example, a shoe) to be dried, the heat pump device 40 dehumidifying and heating air in the chamber 30 to dry the object S, the first temperature sensor 110 measuring a first temperature of air heated by the condenser 43, the second temperature sensor 120 measuring a second temperature of the air having passed through the air outlet 31 of the chamber 30, and the fan 47 provided between the chamber 30 and the heat pump device 40 for circulating air.

The heat pump device 40 includes the compressor 41, the condenser 43, the expansion device 44, and the evaporator 42. The compressor 41, the condenser 43, the expansion device 44, and the evaporator 42 may be connected to each other by refrigerant pipes to form a heat pump cycle, and a refrigerant may be circulated in accordance with the heat pump cycle while flowing in the refrigerant pipes.

The compressor 41 compresses a low-temperature and low-pressure vapor-phase refrigerant and discharges a high-temperature and high-pressure vapor-phase refrigerant. The discharged vapor-phase refrigerant may flow into the condenser 43, and the high-temperature and high-pressure vapor-phase refrigerant may be condensed into a high-pressure liquid-state or approximately liquid-state refrigerant substantially equal to or lower than a condensation temperature. The high-pressure liquid-state or approximately liquid-state refrigerant that has passed the condenser 43 may be expanded and decompressed by the expansion device 44, and the low-temperature and low-pressure two-phase refrigerant that has passed the expansion device 44 may flow into the evaporator 42. The two-phase refrigerant may be evaporated to vapor-phase refrigerant in the evaporator 42.

The chamber 30 and the heat pump device 40 may be connected by the first duct 46 and the second duct 70, and the air in the chamber 30 may move through the ducts and may be circulated between the heat pump device 40 and the chamber 30.

Hot and humid air from the chamber 30 may exchange heat with the refrigerant while passing the evaporator 42. Specifically, the low-temperature and low-pressure two-phase refrigerant brought into the evaporator 42 may be evaporated into a vapor-phase refrigerant by absorbing heat from the hot and humid air passing the evaporator 42. The hot and humid air passing the evaporator 42 may be thereby cooled and dehumidified simultaneously into cool and dry air.

After passing the evaporator 42, the cool and dry air may flow into the condenser 43, and heat exchange may occur between the high-temperature and high-pressure vapor-phase refrigerant and the cool and dry air in the condenser 43. The high-temperature and high-pressure vapor-phase refrigerant may release heat while being condensed into a liquid-phase or approximately liquid-phase refrigerant and, and the cool and dry air may be heated by absorbing the heat released during the condensation of the refrigerant.

The hot and dry air having passed the condenser 43 may flow back into the chamber 30. The object S accommodated in the chamber 30 may be dried by such an air circulation cycle.

The expansion device 44 may be implemented with at least one of a capillary tube or an electrical expansion valve that may control opening degrees based on an electrical signal.

The compressor 41 may be implemented as a frequency changeable inverter compressor. A frequency of the compressor 41 refers to revolutions per second of a motor connected to a compression room of the compressor 41. The compressor 41 may operate at a predetermined starting frequency at the start of a dry course, and afterward, to increase the temperature, the compressor 41 may operate at an operation frequency. The compressor 41 may operate within a range from a minimum frequency and a maximum frequency. A minimum operation frequency and a maximum operation frequency may be set in advance depending on the design.

The shoe care apparatus 1 may further include the third temperature sensor 130 provided at an inlet side of the evaporator 42, and the fourth temperature sensor 140 provided at an outlet side of the compressor 41. The third temperature sensor 130 and the fourth temperature sensor 140 may be installed outside or inside of the refrigerant pipe, respectively, to measure a temperature of the refrigerant circulating in the heat pump cycle. That is, the third temperature sensor 130 may measure a temperature of the refrigerant flowing into the evaporator 42, and the fourth temperature sensor 140 may measure a temperature of the refrigerant discharged from the compressor 41.

In addition, the shoe care apparatus 1 may further include the current sensor 150 that measures a compressor current applied to the compressor 41. The current sensor 150 may measure a power consumed by the compressor 41.

Figure 8:
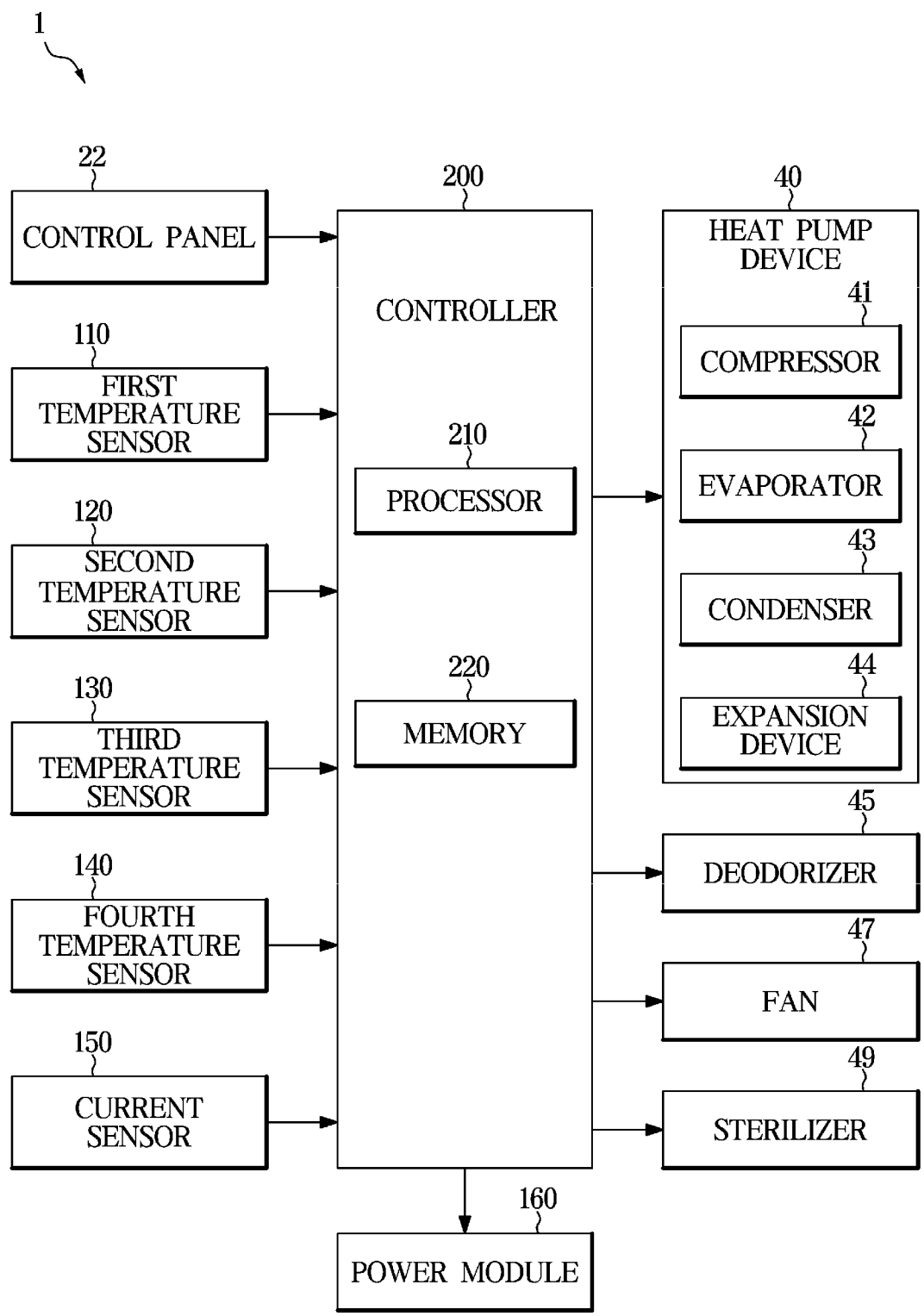
FIG. 8 is a control block diagram illustrating a shoe care apparatus, according to an embodiment of the disclosure.

FIG. 8 is a control block diagram illustrating a shoe care apparatus, according to an embodiment of the disclosure.

Referring to FIG. 8, the shoe care apparatus 1 may include the control panel 22, the heat pump device 40, the deodorizer 45, the fan 47, the sterilizer 49, the first temperature sensor 110, the second temperature sensor 120, the third temperature sensor 130, the fourth temperature sensor 140, the current sensor 150, a power module 160, and the controller 200. Although not illustrated, the shoe care apparatus 1 may further include a communication device (not shown) for transmitting and receiving data with an external device. The controller 200 may be electrically connected to the aforementioned components of the shoe care apparatus 1 and control operations of the components.

The power module 160 may supply power to the components of the shoe care apparatus 1. The power module 160 may be implemented with a printed circuit board and a power circuit mounted on the printed circuit board. For example, the power module 160 may include a capacitor, a coil, a resistor, a processor, and the like, which are mounted on the power circuit board.

The controller 200 may include a memory 220 recording and/or storing programs, instructions and data for controlling operations of the shoe care apparatus 1, and a processor 210 generating a control signal for controlling operations of the shoe care apparatus 1 based on the programs, instructions and/or data recorded and/or stored in the memory 220. The controller 200 may be implemented as a control circuit in which the processor 210 and the memory 220 are mounted. The controller 200 may also include a plurality of processors and a plurality of memories.

The processor 210 may include a logic circuit and an arithmetic circuit in hardware. The processor 210 may process data according to the program and/or instruction provided from the memory 220, and generate a control signal according to a result of the processing. For example, based on a user input of a command to select a care course through the control panel 22, the shoe care apparatus 1 may perform an operation corresponding to the selected care course.

The memory 220 may include a non-transitory memory. More specifically, the memory 220 may include a volatile memory, such as Static Random Access Memory (SRAM) or Dynamic Random Access Memory (DRAM), for temporary storage of data, and a non-volatile memory, such as Read Only Memory (ROM), Erasable Programmable Read Only Memory (EPROM), or Electrically Erasable Programmable Read Only Memory (EEPROM), for long-term storage of data.

As described in FIG. 1, the control panel 22 may be arranged on the door 20. Although the control panel 22 is illustrated in FIG. 1 as being arranged on a front surface of the door 20, a position of the control panel 22 is not limited thereto and may be provided in various positions. The controller 200 may determine a target temperature based on a selection of a shoe type and care course through the control panel 22. Also, the controller 200 may determine an operation time of the shoe care apparatus 1 based on the selected shoe type and care course.

A user may use the control panel 22 to select a shoe type to be cared for. For example, the control panel 22 may provide at least one of a shoe type menu to allow the user to select a shoe type, or a care course menu to allow the user to select a care course. Shoe types may include types according to use or shape, such as heels, sneakers, hiking shoes, boots, sandals, rain boots, and the like. The shoe types may also include types according to material, such as leather, cotton, nylon, synthetic materials, silk, enamel, suede, neoprene, and the like.

The controller 200 may determine a target temperature of air to be supplied into the chamber 30 based on a shoe type. Because different types of shoes have different characteristics, the target temperature for caring the shoes may be set differently according to the characteristics of the shoes. For example, for shoes of synthetic materials, a low target temperature of 30 degrees Celsius or higher and less than 38 degrees Celsius may be set. For shoes of a leather material, a medium target temperature of 38 degrees Celsius or higher and less than 43 degrees Celsius may be set. For shoes of a cotton material, a high target temperature of 43 degrees Celsius or higher and less than 60 degrees Celsius may be set. As another example, when two or more types of shoes are to be cared for or the shoes contain moisture, a target temperature for dehumidification may be set to less than 40 degrees Celsius and a target temperature for deodorization may be set to 40 degrees Celsius or higher and less than 60 degrees Celsius. Through the above, damage to the shoes may be prevented. Furthermore, when both dehumidification and deodorization are desired, deodorization may be performed after dehumidification. For example, the moisture contained in the shoes may be removed at a low temperature and deodorization may then be performed at a high temperature, thereby minimizing the damage to the shoes.

In addition, the user may use the control panel 22 to set a suitable care course. The controller 200 may determine an operation time of the shoe care apparatus 1 based on the selected care course. For example, the care course may include at least one of a standard course, a quick course, an intense course, or a clean storage course. The standard course may be a default care course, and may be defined as a care course in which the shoe care apparatus 1 is operated for a standard time for which dehumidification and deodorization effects are normally exerted. The quick course may be defined as a care course that may exert minimum dehumidification and deodorization effects within a shorter time than in the standard course. The intense course may be defined as a care course that may exert maximum dehumidification and deodorization effects by being operated for a longer time than in the standard course. Furthermore, the clean storage course may be defined as a care course for keeping the shoes for a long time. As such, various care courses may be suitably applied to various shoes, thereby increasing convenience of shoe caring and user satisfaction.

Each of the temperature sensors 110, 120, 130, and 140 may provide a signal to the controller 200 indicating a current temperature measurement value measured by the temperature sensor. The controller 200 may compare the current temperature measurement value to certain values to make particular determinations, as will be described below.

The controller 200 may determine an outside air temperature based on a first temperature measured by the first temperature sensor 110 or a second temperature measured by the second temperature sensor 120 at the start of operation of the shoe care apparatus 1. Before the start of operation of the shoe care apparatus 1, the door 20 may be opened to put shoes into the chamber 30. As a result, the temperature of the air in the chamber 30 may initially be equal or substantially equal to the outside air temperature. Also, at the start of operation of the shoe care apparatus 1, the air in the chamber 30 may be in a non-heated state. Accordingly, at the start of operation of the shoe care apparatus 1, the outside air temperature may be determined by using the first temperature sensor 110 located in a flow path between the condenser 43 and the fan 47 or the second temperature sensor 120 located at the air outlet 31 of the chamber 30.

The controller 200 may determine an operation frequency of the compressor 41 based on the target temperature and the outside air temperature, and may operate the compressor 41 at the determined operation frequency. The target temperature and the outside air temperature are factors that may heavily influence determination of the operation frequency of the compressor 41. For example, based on the outside air temperature being a low temperature, the operation frequency of the compressor 41 may be set to a high value to force the temperature of the air supplied into the chamber 30 to quickly reach the target temperature. The larger the difference between the outside air temperature and the target temperature, the higher the value that the operation frequency of the compressor 41 may be set to. In contrast, based on the difference between the target temperature and the outside air temperature being small (e.g., when the difference between the target temperature and the outside air temperature is 10 degrees Celsius or less), the operation frequency of the compressor 41 may be set to a low value, because when the temperature in the chamber 30 rises suddenly, it may exceed the target temperature.

The controller 200 may also control the operation frequency of the compressor 41 based on a temperature of the air heated by the condenser 43 and the target temperature. That is, the controller 200 may control the operation frequency of the compressor 41 based on the first temperature measured by the first temperature sensor 110. When the compressor 41 is operated at a fixed operation frequency for the whole operation time, the temperature of the air circulating in the closed shoe care apparatus 1 is expected to rise constantly, failing to maintain the constant target temperature. To prevent the above, the operation frequency of the compressor 41 may be controlled.

To maintain the air supplied into the chamber 30 at the target temperature, the controller 200 of the shoe care apparatus 1 may perform fuzzy control. Herein, "fuzzy control" refers to a control method of periodically controlling the operation frequency of the compressor 41 for the first temperature of the air heated by the condenser 43 to follow the target temperature. The controller 200 may increase or decrease the operation frequency of the compressor 41 for the first temperature to follow the target temperature, in response to the first temperature reaching a predetermined first threshold temperature. The controller 200 may use a fuzzy table stored in advance to determine a control value of the operation frequency.

In addition, to complement the limit of the fuzzy control, the controller 200 may further perform compressor switching control. The compressor switching control refers to a control method for switching the compressor 41 on or off.

Furthermore, to prevent damage caused by excessive current applied to the compressor 41, the controller 200 may perform compressor current control. The compressor current control refers to a control method for controlling a current applied to the compressor 41 by periodically controlling the operation frequency of the compressor 41 based on a current value or power value applied to the compressor 41. That is, the controller 200 may control the operation frequency of the compressor 41 so that the compressor current is substantially equal to or less than a predetermined limit current. The controller 200 may use a pre-stored current control table to determine a control value of the operation frequency.

However, the shoe care apparatus 1 may include various other components that may generate heat in addition to the compressor 41. The shoe care apparatus 1 may generate heat by a motor rotating the fan 47, the deodorizer 45, or the sterilizer 49.

The controller 200 may synchronize an operation of the fan 47 with the compressor 41, and the fan 47 may operate together with the compressor 41 according to a control signal from the controller 200, which may be defined as interlocking control in this disclosure. The interlocking control will be described in detail with reference to FIG. 9 through FIG. 12.

Although the rotation of the fan 47 may be a factor that may reduce a temperature inside the chamber 30, the temperature inside the chamber 30 may exceed a target temperature due to the heat generation of the motor, the deodorizer 45, or the sterilizer 49. Accordingly, embodiments to be described below may solve the above problem by releasing the interlocking control according to a predetermined condition and through a separate control.

As described above, the shoe care apparatus 1 according to an embodiment may further include the deodorizer 45 and/or the sterilizer 49. According to an embodiment, the controller 200 may control the deodorizer 45 and/or the sterilizer 49 to synchronize operation with the fan 47. Accordingly, the compressor 41 and the fan 47, and the deodorizer 45 and/or the sterilizer 49 may operate together in synchronization with each other. In this case, "ON" times within a cycle may be different from each other. In principle, the deodorizer 45 and/or the sterilizer 49 may be operated continuously during a main operation, or may periodically turn on and off for effective deodorization and sterilization.

The deodorizer 45 and/or the sterilizer 49 may operate for a portion of the time (a particular period) of the main operation, even when the fan 47 is turned off. The particular period may be in an early, middle, or late portion of the time of the main operation, depending on the setting. The particular period may also be a period during which the interlocking control between the compressor 41 and the fan 47 is released.

According to an embodiment, the controller 200 may control the deodorizer 45 to operate in response to performance of the asynchronous operation mode. The deodorizer 45 may be configured to deodorize air discharged from the chamber 30, and may include a light source emitting ultraviolet light.

Furthermore, according to an embodiment, the controller 200 may control the sterilizer 49 to operate in response to performance of the asynchronous operation mode. The sterilizer 49 may be configured to sanitize or sterilize air discharged from the chamber 30 and may include a xenon lamp.

Each component of the shoe care apparatus 1 according to an embodiment and operations for each component of the shoe care apparatus 1 have been described above. Hereinafter, a control method of the shoe care apparatus 1 is described in detail.

Figure 9:
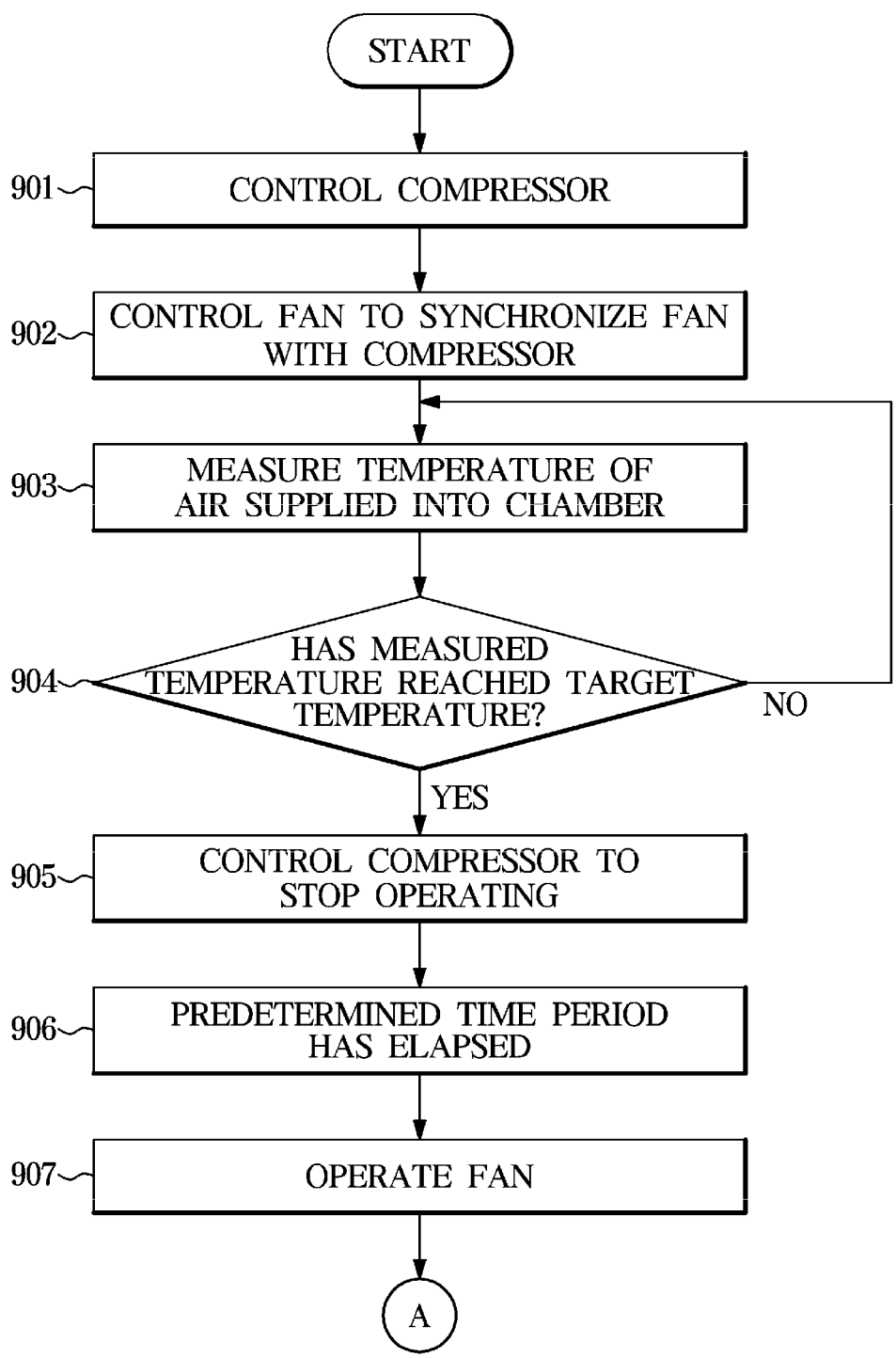
FIG. 9 is a flowchart illustrating a synchronous operation mode switching to an asynchronous operation mode in a control method of a shoe care apparatus, according to an embodiment of the disclosure.
Figure 13:
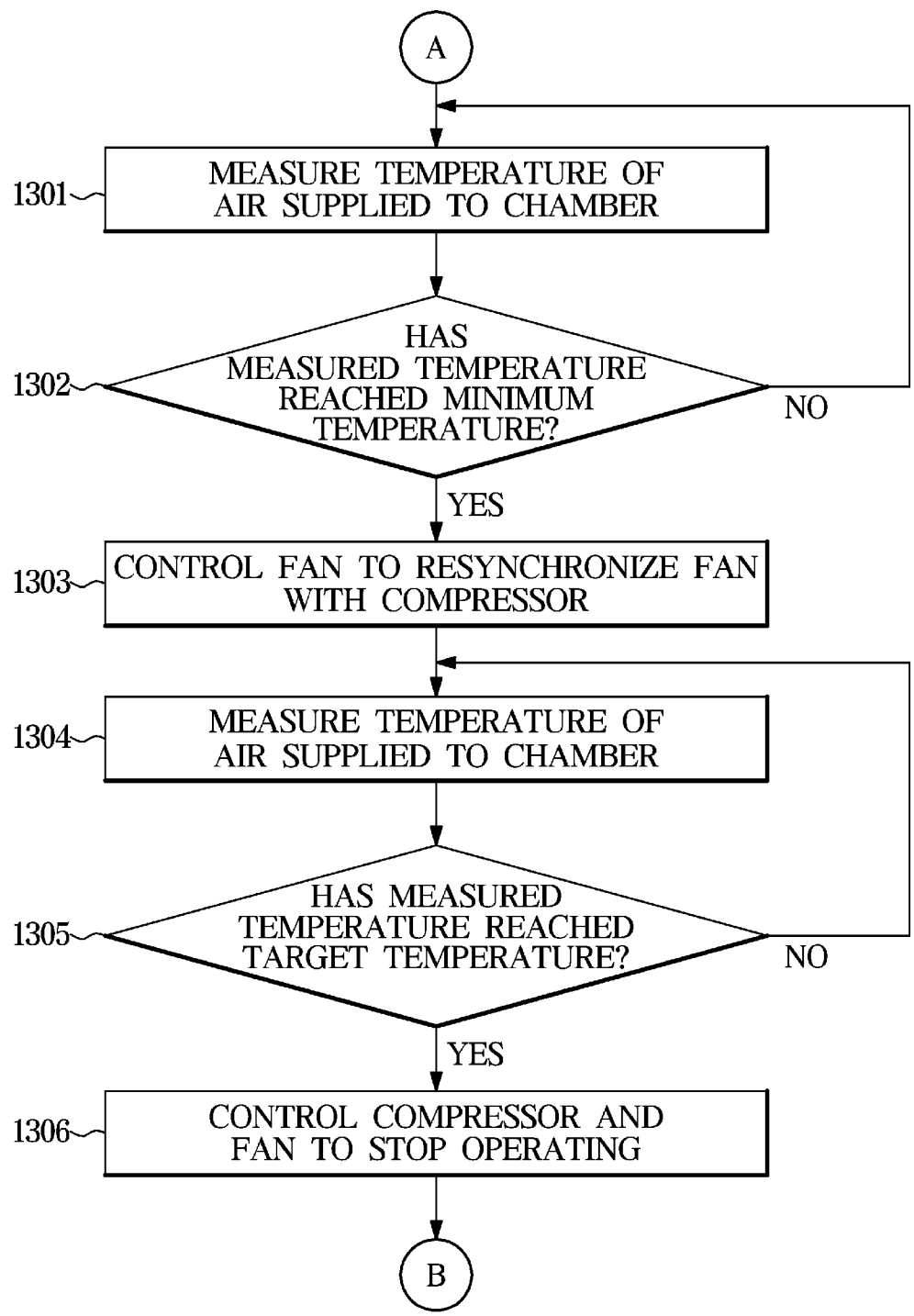
FIG. 13 is a flowchart illustrating an asynchronous operation mode switching to a synchronous operation mode in a control method of a shoe care apparatus, according to an embodiment of the disclosure.
Figure 14:
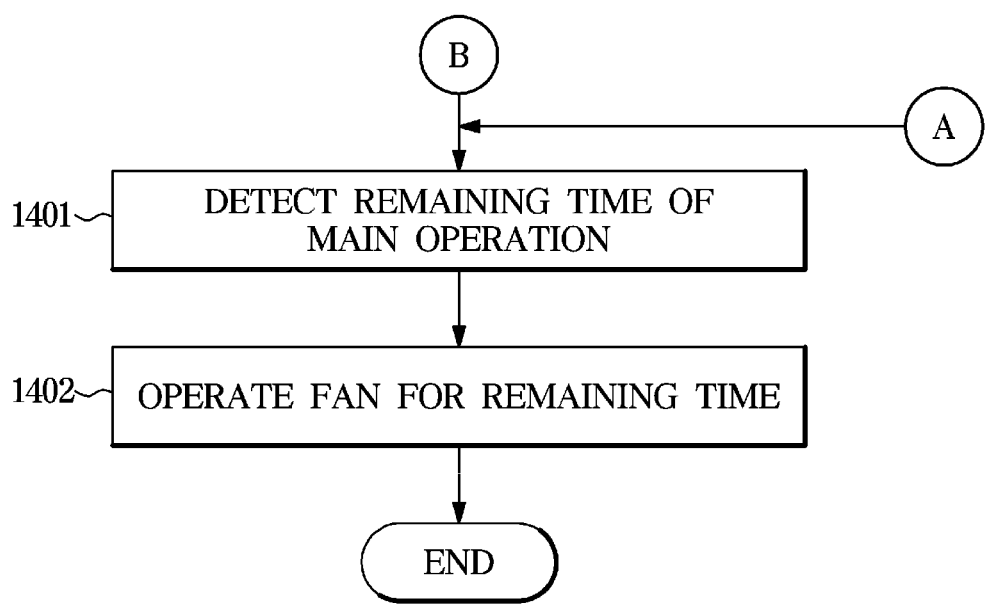
FIG. 14 is a flowchart illustrating a final stage of a control method of a shoe care apparatus performed before an end of a main operation, according to an embodiment of the disclosure.

FIG. 9 is a flowchart illustrating a synchronous operation mode switching to an asynchronous operation mode in a control method of a shoe care apparatus, according to an embodiment of the disclosure. The method embodiment according to FIG. 9, as well as subsequent FIGS. 13 and 14, is described with reference to an example execution thereof illustrated in FIG. 11, FIG. 12A and FIG. 12B.

The disclosed shoe care apparatus may perform a synchronous operation mode and an asynchronous operation mode to complete an operation of a shoe care course input from a user. Herein, a "synchronous operation mode" refers to an operation of the fan 47 being dependent on the compressor 41 to operate together, and an "asynchronous operation mode" refers to an operation of the compressor 41 or the fan 47 being independent of each other. The shoe care apparatus 1 may be controlled to maintain different target temperatures depending on a type and a material of shoes accommodated. In response to exceeding the target temperature, damage to the shoes may occur. Accordingly, the disclosed shoe care apparatus may provide efficient shoe care performance while preventing shoe damage, by switching between the synchronous operation mode and the asynchronous operation mode according to predetermined conditions.

Referring to FIG. 9, the controller 200 may control the compressor 41 so that a temperature to be managed becomes a target temperature (901). The present embodiment is in the context of a drying operation, which may be a main operation of the entire operation process of the shoe care apparatus 1, and as such the controller 200 may control the compressor 41 to maintain a target temperature of air to be supplied into the chamber 30. However, the main operation may be an operation other than the drying operation, according to a course selected by the user.

Figure 11:
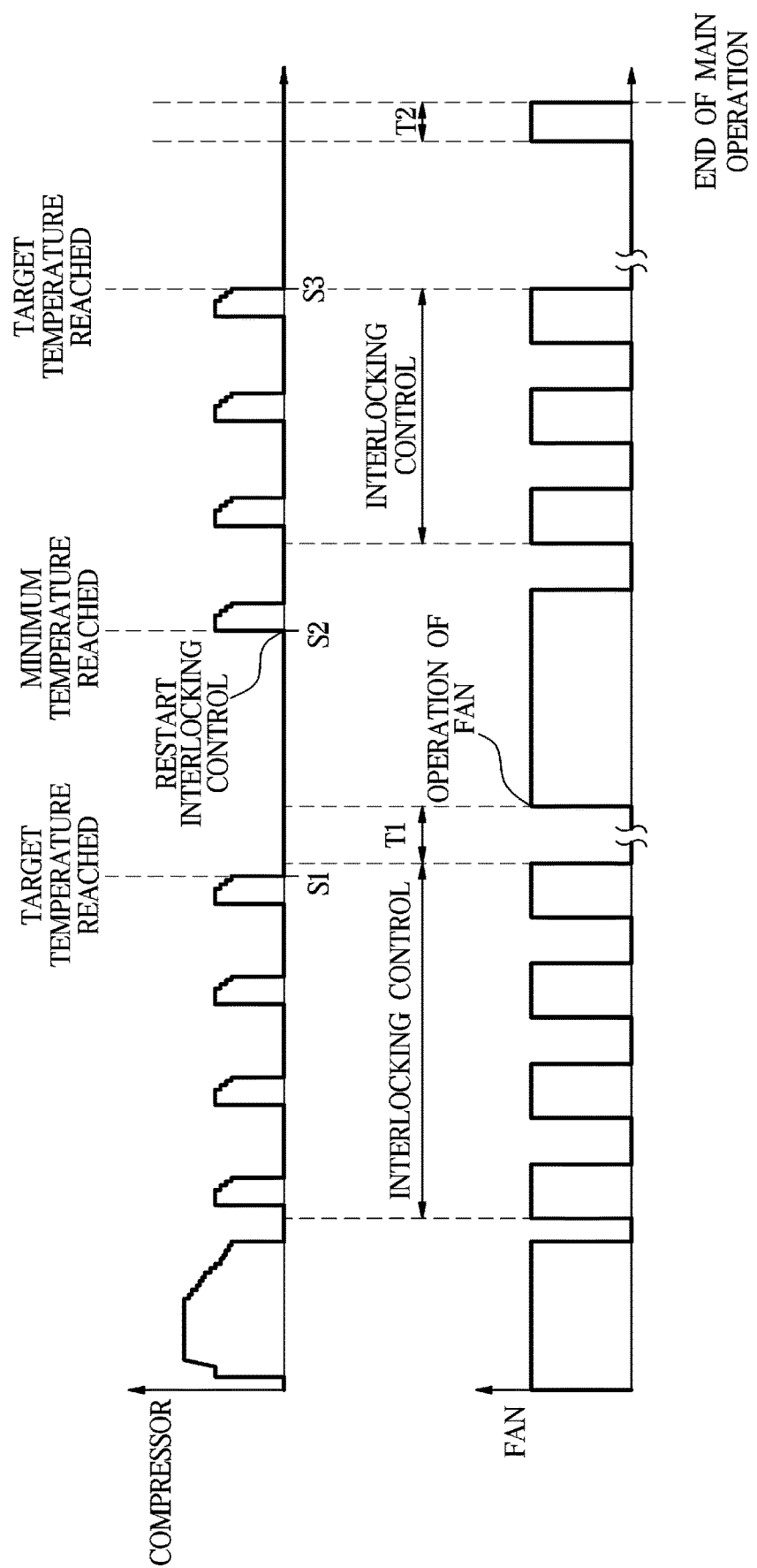
FIG. 11, FIG. 12A, and FIG. 12B are diagrams illustrating example executions of a control method of a shoe care apparatus, according to an embodiment of the disclosure.

The controller 200 controls the fan 47 to synchronize the fan 47 with the compressor 41 (902). Referring to FIG. 11, an ON/OFF state of the fan 47 may be interlocked with an ON/OFF state of the compressor 41, during an interlocking control period. For example, the controller 200 may control the fan 47 to be turned on each time the compressor 41 is turned on during ON/OFF control of the compressor 41.

Figure 12A:
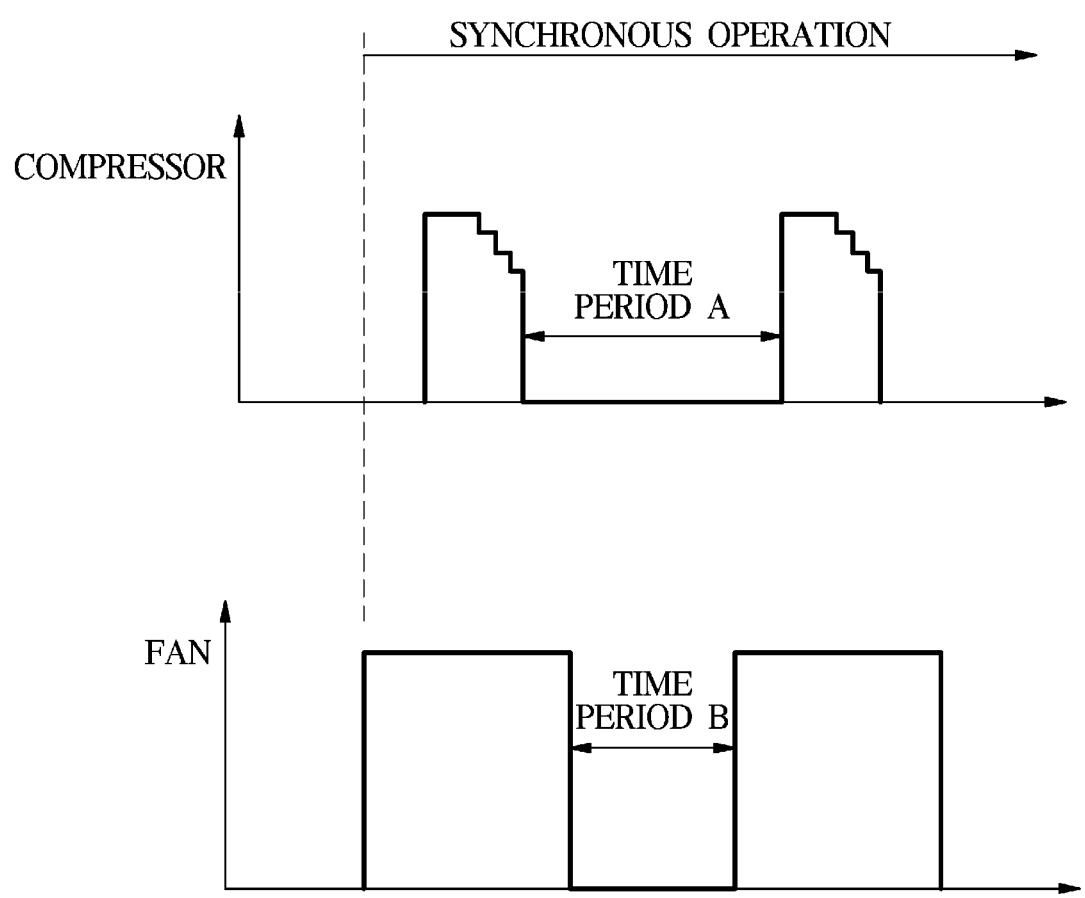

In addition, as shown in FIG. 12A, in response to controlling the fan 47 in conjunction with the compressor 41, the controller 200 may control the fan 47 to be turned on a predetermined time period earlier than the compressor 41, and may control the fan 47 to be turned off a predetermined time period after the compressor 41 is turned off.

Specifically, the controller 200 may control the compressor 41 so that the temperature to be managed becomes a target temperature, and may synchronize the fan 47 so that the operation of the fan 47 is turned off for a time period B, for each time period A during which the compressor 41 is turned off. In this instance, the time period B which is the OFF time of the fan 47 may be shorter than the time period A which is the OFF time of the compressor 41. In this instance, a difference between the time period A and the time period B may be set according to a time period of the main operation, the target temperature, and an external temperature. The controller 200 may reduce noise generated from the shoe care apparatus 1 by starting and ending the operation of the compressor 41 while the fan 47 is in operation.

Referring to FIG. 11 and FIG. 12A, the controller 200 may terminate the operation of the compressor 41, in response to a frequency of the compressor 41 reaching a minimum operation frequency after gradually decreasing the operation frequency of the compressor 41. Accordingly, the compressor 41 may be protected. As shown in FIG. 11, in combination with the interlocking control, this may result in a periodic cycle of controlling the fan to operate, controlling the compressor to operate after the fan starts operating, controlling the compressor to stop operating once the minimum operation frequency is reached, and controlling the fan to stop operating after the compressor stops operating.

The controller 200 may measure a temperature of the air supplied into the chamber 30 (903). Specifically, the controller 200 may periodically measure the temperature of the air during an interlocking control of the compressor 41 and the fan 47. In this instance, the measured temperature may be obtained by the first temperature sensor 110 provided between the condenser 43 and the fan 47.

As the compressor 41 and the fan 47 continue to operate, the air temperature inside the chamber 30 may be expected to rise. Accordingly, the temperature inside the chamber 30 may reach the target temperature over time.

In response to the measured temperature reaching the target temperature (904), at a point indicated as S1 in FIG. 11, the controller 200 may control the compressor 41 to stop operating (905). Accordingly, as the compressor 41 is stopped, the temperature inside the chamber 30 may be expected to decrease. In this instance, because the fan 47 and the compressor 41 are synchronized, the fan 47 may be stopped together with the compressor 41, or may be stopped a period of time after the compressor 41 is stopped. The target temperature may be, for example, approximately 40 degrees Celsius, but may be determined to be different based on a selection of a shoe type and a care course.

Through the operation 905, the controller 200 may maintain or lower the temperature inside the chamber 30, but because the compressor 41 and the fan 47 remain stopped, a drying performance of the shoe care apparatus 1 may decrease.

Accordingly, in response to the predetermined time period (T1 of FIG. 11) having elapsed (906), the controller 200 controls the fan 47 to operate (907). In other words, when the predetermined time has elapsed, the controller 200 may forcibly operate the fan 47 in a state where the compressor 41 is stopped. The shoe care apparatus 1 may operate the fan 47 at a temperature relatively lower than the target temperature, thereby ensuring a drying performance to some extent. Accordingly, the interlocking control by the operation 902 may be released. The predetermined time period may be approximately 10 minutes, but may vary depending on an external temperature or settings in an initial manufacturing process.

The controller 200 according to an embodiment may perform a synchronous operation mode for controlling the compressor 41 and the fan 47 to operate together, and an asynchronous operation mode in which the fan 47 operates without operating the compressor 41. That is, the controller 200 may switch from the synchronous operation mode to the asynchronous operation mode and from the asynchronous operation mode to the synchronous operation mode.

Figure 12B:
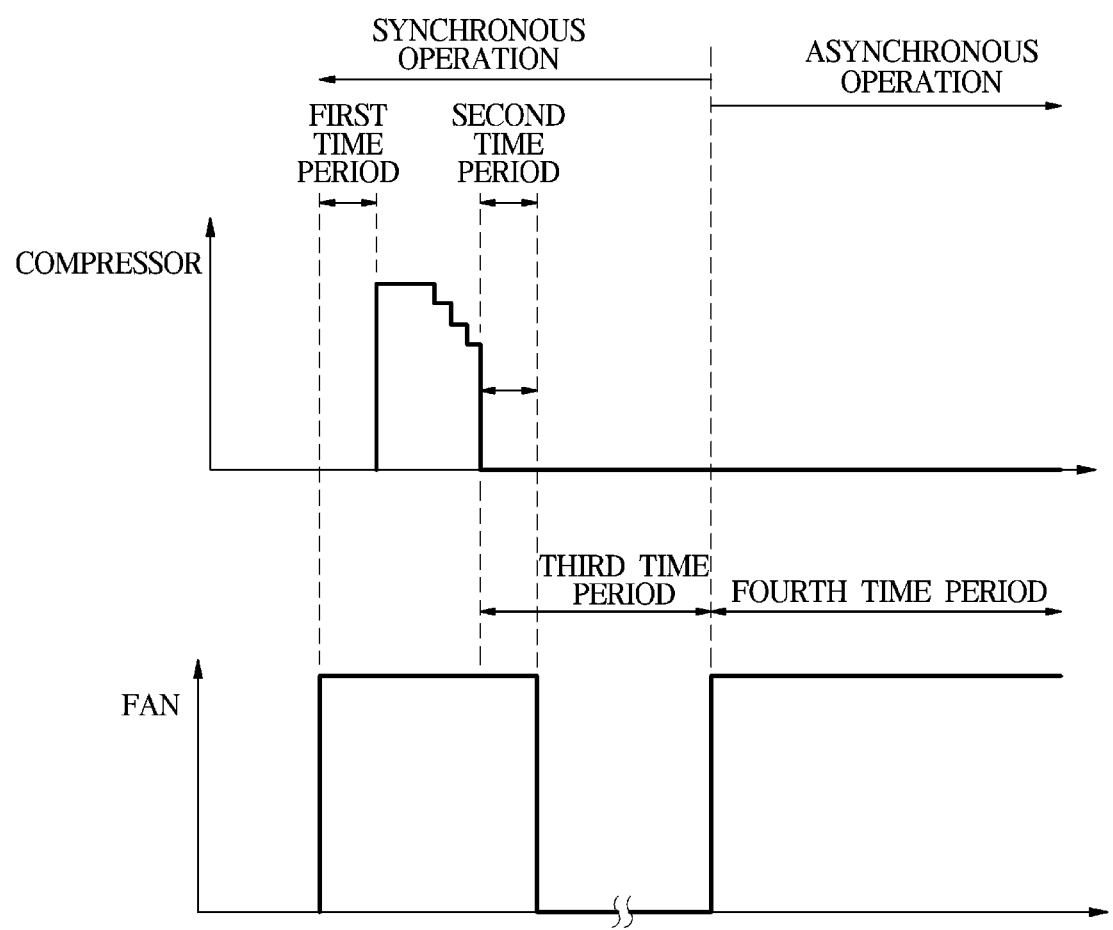

Referring to FIG. 12B, in the synchronous operation mode, the controller 200 may control the fan 47 to operate, and then may control the compressor 41 to operate in response to a first time period having elapsed after a start of the operation of the fan 47, based on a first signal received from a temperature sensor. The controller 200 may further control the compressor 41 to stop operating based on a second signal received from the temperature sensor.

After performing the synchronous operation mode, the controller 200 may control the fan 47 to stop operating in response to a second time period having elapsed after a stop of an operation of the compressor 41.

Also, the controller 200 may control the fan 47 to operate in response to a third time period having elapsed after the compressor 41 stops operating, thereby performing the asynchronous operation mode. The asynchronous operation mode may be a mode in which the operation of the fan 47 is not dependent on the operation of the compressor 41 and the fan 47 may start or stop operating independently of the operation of the compressor 41. In this instance, the first time period, the second time period, and the third time period may be predetermined, and be determined according to various specifications of the shoe care apparatus 1.

According to an embodiment, the first time period may be equal or substantially equal to the second time period. Accordingly, in the synchronous operation mode, the operation of the fan 47 may start a predetermined amount of time earlier and operate until a predetermined amount of time later than the operation of the compressor 41. Alternatively, the first time period may be different from the second time period.

Also, according to an embodiment, the second time period may be shorter than the third time period. Accordingly, the controller 200 may perform the asynchronous operation mode after the compressor 41 and the fan 47 stop operating.

While performing the asynchronous operation mode, the controller 200 may resume the synchronous operation mode by controlling the compressor 41 to operate based on a second signal received from the temperature sensor. For example, the controller 200 may resume the synchronous operation mode, in response to a determination that a temperature inside the chamber 30 is substantially equal to or lower than a minimum temperature lower than the target temperature, based on the second signal received from the temperature sensor.

The main operation time of the shoe care apparatus 1 corresponds to a time period determined according to a shoe care course input from a user. The controller 200 may perform both the synchronous operation mode and the asynchronous operation mode consecutively over a predetermined time period to complete an execution of the shoe care course input from the user. In this case, the controller 200 may perform the asynchronous operation mode for a fourth time period to complete the execution of the shoe care course. Here, the fourth time period may be a shorter time than the third time period.

The release of interlocking based on the temperature inside the chamber 30 has been described above with reference to FIG. 9. The release of interlocking may be performed according to other conditions in addition to the temperature inside the chamber 30. For example, when the shoe care apparatus 1 is operated in an environment where an external temperature is very low, dew condensation may occur on a surface of the evaporator 42 due to a temperature difference, and when freezing occurs on the surface of the evaporator 42, an abnormal operation of the heat pump device 40 may occur. Accordingly, the release of interlocking may be performed based on an inlet temperature of the evaporator 42 in addition to the temperature inside the chamber 30, which will be described with reference to FIG. 10.

Figure 10:
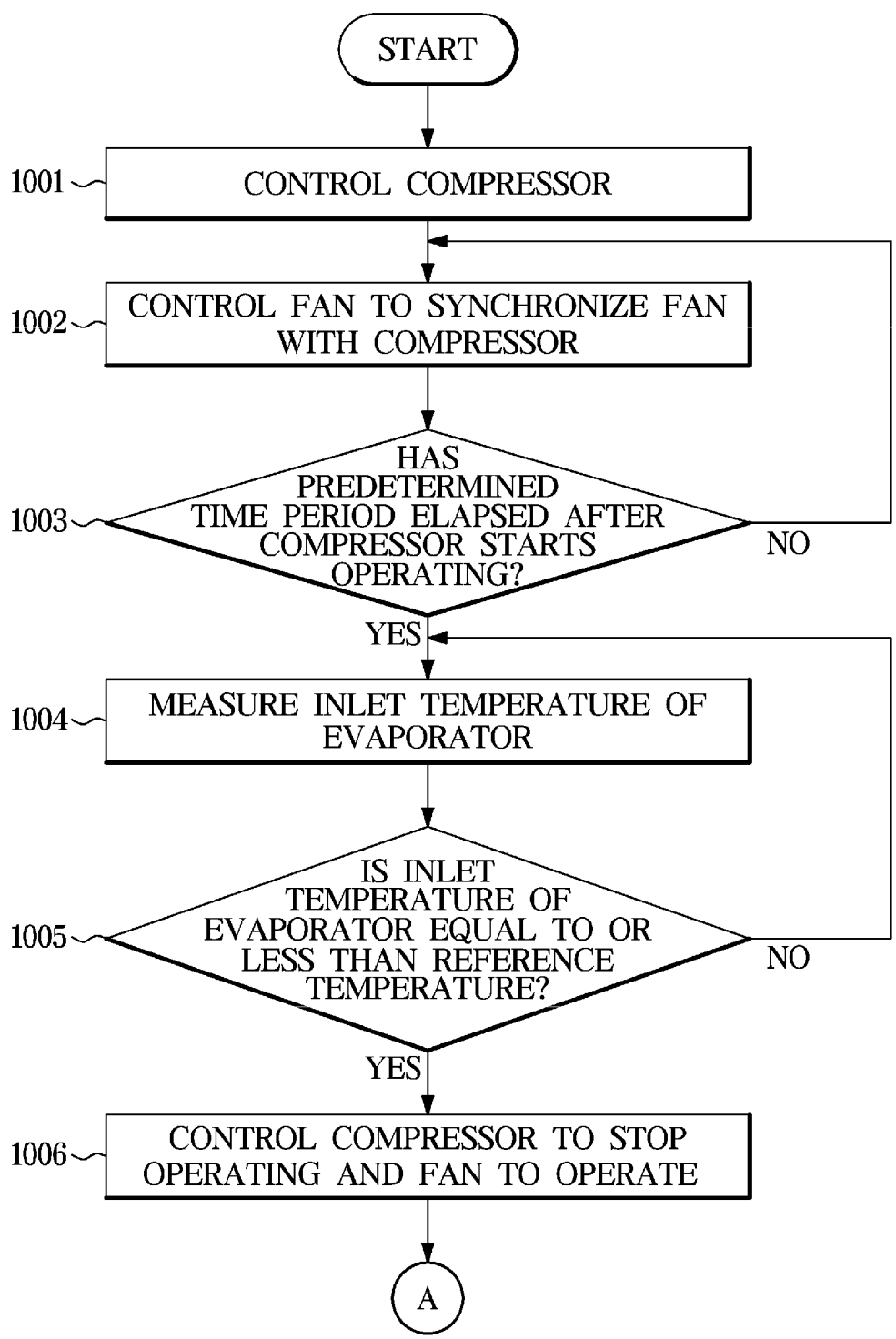
FIG. 10 is a flowchart illustrating a synchronous operation mode switching to an asynchronous operation mode in a control method of a shoe care apparatus, according to another embodiment of the disclosure.

FIG. 10 is a flowchart illustrating a synchronous operation mode switching to an asynchronous operation mode in a control method of a shoe care apparatus, according to another embodiment of the disclosure.

Referring to FIG. 10, the controller 200 may control the compressor 41 so that a temperature to be managed becomes a target temperature (1001). The present embodiment also belongs to a drying operation which may be a main operation of the entire operation of the shoe care apparatus 1, and the controller 200 controls the compressor 41 in order to maintain a target temperature of air to be supplied into the chamber 30.

The controller 200 controls the fan 47 to synchronize the fan 47 with the compressor 41 (1002). Referring to FIG. 11, the ON/OFF state of the fan 47 may be interlocked with the ON/OFF state of the compressor 41, during an interlocking control period. For example, the controller 200 may control the fan 47 to be turned on each time the compressor 41 is turned on during ON/OFF control of the compressor 41.

Also, as shown in FIG. 12A, in response to controlling the fan 47 in conjunction with the compressor 41, the controller 200 may control the fan 47 to be turned on a predetermined time period earlier than the compressor 41, and may control the fan 47 to be turned off a predetermined time period after the compressor 41 is turned off.

Specifically, the controller 200 may control the compressor 41 so that the temperature to be managed becomes a target temperature, and may synchronize the fan 47 so that the operation of the fan 47 is turned off for a time period B, for each time period A during which the compressor 41 is turned off. In this instance, the time period B which is the OFF time of the fan 47 may be shorter than the time period A which is the OFF time of the compressor 41. In this instance, a difference between the time period A and the time period B may be set according to a time period of the main operation, the target temperature, and an external temperature. The controller 200 may reduce noise generated from the shoe care apparatus 1 by starting and ending the operation of the compressor 41 while the fan 47 is in operation.

Referring to FIG. 11 and FIG. 12A, the controller 200 may terminate the operation of the compressor 41, in response to a frequency of the compressor 41 reaching a minimum operation frequency after gradually decreasing the operation frequency of the compressor 41. Accordingly, the compressor 41 may be protected.

In response to a predetermined time period having elapsed after the compressor 41 starts operating (1003), the controller 200 measures an inlet temperature of the evaporator 42 (1004). The predetermined time period may be, for example, 40 minutes, without being limited thereto. The inlet temperature may be obtained from the third temperature sensor 130 provided on the inlet side of the evaporator 42. The controller 200 may measure the inlet temperature once, after the predetermined time period has elapsed, or may continuously measure the inlet temperature at regular intervals after the predetermined time period has elapsed.

In response to the inlet temperature of the evaporator 42 being substantially equal to or less than a reference temperature (1005), the controller 200 controls the compressor 41 to stop (1006). Here, the reference temperature may be −5 degrees Celsius, as a reference to prevent freezing on a surface of the evaporator 42. However, the above temperature value is only an example and may vary depending on the setting. A temperature decrease of the evaporator 42 may be stopped as the compressor 41 is turned off, and moisture on the surface of the evaporator 42 may be thereby prevented from freezing.

Accordingly, the controller 200 may control the fan 47 to operate immediately after the compressor 41 stops operating (1006). In other words, the controller 200 may forcibly operate the fan 47 as soon as the compressor 41 stops operating, or may forcibly operate the fan 47 a predetermined period of time after the compressor 41 stops operating. The operation of the fan 47 is maintained for a predetermined time period. Here, the predetermined time period may be approximately 10 minutes or 15 minutes, but may vary depending on an external temperature or settings in an initial manufacturing process. On the other hand, unlike the embodiment according to FIG. 9, because the compressor 41 is not stopped by an increase in the temperature inside the chamber 30, the compressor 41 may be stopped without waiting for a predetermined time period, and the fan 47 may be operated in an asynchronous operation mode immediately.

According to an embodiment, in the synchronous operation mode, the controller 200 may control the fan 47 to operate, and then control the compressor 41 to operate in response to a first time period having elapsed after a start of the operation of the fan 47, based on a first signal received from the first temperature sensor 110. The controller 200 may further control the compressor 41 to stop operating based on a second signal received from the first temperature sensor 110. The controller 200 may control the fan 47 to stop operating in response to a second time period having elapsed after performing the synchronous operation mode. In this instance, the compressor 41 and the fan 47 are not being operated, and the controller 200 controls the fan 47 to operate for a third time period based on a signal received from the third temperature sensor 130, thereby performing the asynchronous operation mode. Also, the controller 200 may control the fan 47 to stop operating based on a signal received from the third temperature sensor 130 before the third time period elapses. In an embodiment, by stopping the operation of the compressor 41 in response to the inlet temperature of the evaporator 42 being substantially equal to or less than a predetermined temperature, freezing on a surface of the evaporator 42 may be prevented. For example, the controller 200 may receive a signal from the third temperature sensor 130, and based on a determination that a temperature of the evaporator 42 is below −5 degrees Celsius, may stop the operation of the compressor 41.

The embodiments according to FIG. 9 and FIG. 10 relate to release of interlocking between the compressor 41 and the fan 47 based on specific conditions. One or more embodiments according to the disclosure belong to a drying operation which is a main operation of the shoe care apparatus 1, and an operation time of the main operation may be 4 hours, but the operation time may be determined based on a selection of a shoe type and care course.

Based on the main operation being in operation, the controller 200 may revert the above-described interlocking control to improve a deodorizing performance and a dehumidifying performance. However, when a temperature inside the chamber 30 again has an unexpected value, it may be considered that a failure has occurred in components of the shoe care apparatus 1, which will be described with reference to FIG. 13.

FIG. 13 is a flowchart illustrating an asynchronous operation mode switching to a synchronous operation mode in a control method of a shoe care apparatus, according to an embodiment of the disclosure.

Referring to FIG. 13, the controller 200 measures a temperature of air supplied to the chamber 30 (1301). A temperature measurement has been described in operation 903 of FIG. 9.

In response to the measured temperature reaching a minimum temperature (1302), at a point indicated as S2 in FIG. 11, the controller 200 may control the fan 47 to resynchronize the fan 47 with the compressor 41 (1303). In this instance, the minimum temperature may correspond to a value set depending on a purpose of operation (e.g., deodorization or dehumidification), and may refer to a temperature to be maintained at least in the main operation. The minimum temperature may correspond to a value reduced from the target temperature due to a drop in temperature as the compressor 41 is stopped. Through this operation, the compressor 41 and the fan 47 may start operating again, and thus an optimal condition may be formed in which a dehumidification function, a deodorization function, and a sterilization function may be sufficiently performed.

After restarting the compressor 41 and the fan 47, the controller 200 measures a temperature of the air supplied to the chamber again (1304). Likewise, as the compressor 41 and the fan 47 continue to operate, the temperature of the air inside the chamber 30 rises. Accordingly, the temperature inside the chamber 30 may reach the target temperature over time.

In response to the measured temperature reaching the target temperature (1305), at a point indicated as S3 in FIG. 11, the controller 200 controls the compressor 41 and the fan 47 to stop operating (1306). When the temperature inside the chamber 30 is not maintained due to the interlocking control, the controller 200 may stop the operations of both the compressor 41 and the fan 47, to prioritize component protection.

The embodiments of FIG. 9 to FIG. 13 together describe a control since the main operation has started. The controller 200 may forcibly operate the fan 47 for a predetermined time period regardless of various conditions, during a predetermined remaining time period from a point in time at which the main operation ends, which will be described with reference to FIG. 14.

FIG. 14 is a flowchart illustrating a final stage of a control method of a shoe care apparatus performed before an end of a main operation, according to an embodiment of the disclosure.

Referring to FIG. 14, the controller 200 may detect a remaining time of a main operation (1401). An operation time of the main operation may correspond to a time preset according to a course selected by a user. For example, the controller 200 may determine a predetermined amount of time (e.g., 1 minute) from an end time of the main operation as the remaining time.

The controller 200 may operate the fan 47 for the remaining time (T2 in FIG. 11) (1402). According to the disclosed embodiments, an interlocking control and release of the interlocking control may be repeated before an end of the main operation, and as such an operating state of each of the compressor 41 and the fan 47, at a point in time that the remaining time begins, may vary depending on a temperature inside the chamber 30 or an inlet temperature of the evaporator 42.

For example, in response to both the compressor 41 and the fan 47 being in a stopped state at the point in time that the remaining time begins, the controller 200 may operate only the fan 47 during the remaining time. Also, in response to both the compressor 41 and the fan 47 being in operation at the point in time that the remaining time begins, the controller 200 may stop the operation of the compressor 41 and continue to operate only the fan 47 for the remaining time. Furthermore, in response to only the compressor 41 being operated at the point in time that the remaining time begins, the controller 200 may stop the operation of the compressor 41 for the remaining time and operate only the fan 47. In addition, in response to only the fan 47 being operated at the point in time that the remaining time begins, the controller 200 may maintain the operation of the fan 47 for the remaining time.

The disclosed embodiments may be embodied in the form of recording medium storing instructions executable by a computer. The instructions may be stored in the form of program code and, when executed by a processor, may generate a program module to perform the operations of the disclosed embodiments. The recording medium may be implemented as a non-transitory computer-readable recording medium.

The computer-readable recording medium may include all kinds of recording media in which instructions which may be decoded by a computer are stored of, for example, a read only memory (ROM), random access memory (RAM), magnetic tapes, magnetic disks, flash memories, optical recording medium, and the like.

Although embodiments of the disclosure have been described with reference to the accompanying drawings, a person having ordinary skilled in the art will appreciate that other specific modifications may be easily made without departing from the technical spirit or essential features of the disclosure. Therefore, the foregoing embodiments should be regarded as illustrative rather than limiting in all aspects.

What is claimed is:

1. A shoe care apparatus, comprising:
    a chamber configured to accommodate shoes;
    a heat pump device comprising a condenser configured to heat air supplied to the chamber and a compressor configured to discharge a refrigerant to the condenser;
    a fan configured to supply the heated air to the chamber;
    a temperature sensor configured to obtain a temperature of the air supplied to the chamber;
    a control input device configured to receive an input from a user for selecting a shoe care course among a plurality of shoe care courses, the input corresponding to a target temperature and an operation time period based on the selected shoe care course; and
    a controller configured to, for a time period corresponding to the operation time period:
        perform a synchronous operation mode for controlling the compressor and the fan to operate together, based on receipt of a first signal from the temperature sensor, wherein the synchronous operation mode includes:
            controlling the fan to operate,
            controlling the compressor to operate in response to a predetermined first time period having elapsed after a start of operation of the fan, and
            controlling the compressor to stop operating based on receipt of a second signal from the temperature sensor, the second signal indicating that the temperature of the air is substantially equal to or greater than the target temperature,
        after performing the synchronous operation mode, control the fan to stop operating in response to a predetermined second time period having elapsed after a stop of an operation of the compressor,
        perform an asynchronous operation mode for controlling the fan to operate without operating the compressor, wherein the asynchronous operation mode includes controlling the fan to operate in response to a predetermined third time period having elapsed after the stop of the operation of the compressor, and
        stop the asynchronous operation mode and resume the synchronous operation mode, based on receipt of the first signal from the temperature sensor while the asynchronous operation mode is performed.

2. The shoe care apparatus of claim 1, wherein the predetermined first time period is substantially equal to the predetermined second time period.

3. The shoe care apparatus of claim 1, wherein the predetermined second time period is shorter than the predetermined third time period.

4. The shoe care apparatus of claim 1,
    wherein the predetermined first time period is different from the predetermined second time period, and
    wherein the predetermined second time period is shorter than the predetermined third time period.

5. The shoe care apparatus of claim 1,
    wherein the predetermined first time period is substantially equal to the predetermined second time period, and
    wherein the predetermined second time period is shorter than the predetermined third time period.

6. The shoe care apparatus of claim 1,
    wherein the controller is configured to complete execution of the shoe care course after performing the asynchronous operation mode for a duration of a predetermined fourth time period, and
    wherein the predetermined fourth time period is shorter than the predetermined third time period.

7. The shoe care apparatus of claim 1, further comprising a deodorizer configured to remove an odor from air discharged from the chamber,
    wherein the controller is further configured to control the deodorizer to operate in response to performance of the asynchronous operation mode.

8. The shoe care apparatus of claim 7, wherein the deodorizer comprises a light source configured to emit ultraviolet light.

9. The shoe care apparatus of claim 1, further comprising a sterilizer configured to sterilize air discharged from the chamber,
    wherein the controller is further configured to control the sterilizer to operate in response to performance of the asynchronous operation mode.

10. The shoe care apparatus of claim 9, wherein the sterilizer comprises a xenon lamp.

11. The shoe care apparatus of claim 1, further comprising a holder detachably mounted on the chamber,
    wherein the heated air is supplied to the chamber via the holder.

12. The shoe care apparatus of claim 11, wherein the holder comprises:
    a support body,
    at least one support frame protruding from the support body and configured to hold a shoe,
    a coupler configured to connect to an air inlet of the chamber and to guide the heated air from the air inlet to the at least one support frame through the support body, and
    at least one nozzle formed on a bottom surface of the at least one support frame and configured to supply the heated air to the chamber.

13. The shoe care apparatus of claim 1, wherein the controller is configured to perform the asynchronous operation mode after performing the synchronous operation mode.

14. The shoe care apparatus of claim 1, wherein the first signal indicates the temperature of the air to be substantially equal to or less than a predetermined minimum temperature.

15. A shoe care apparatus, comprising:
a chamber configured to accommodate shoes;
a heat pump device comprising a compressor, an evaporator, and a condenser;
a fan configured to supply air, heated by the condenser, to the chamber;
an air temperature sensor configured to detect a temperature of the air supplied to the chamber;
a refrigerant temperature sensor disposed on an inlet of a refrigerant pipe and configured to detect a temperature of a refrigerant supplied to the evaporator by the refrigerant pipe;
a control input device configured to receive an input from a user for selecting a shoe care course among a plurality of shoe care courses, the input corresponding to a target temperature and an operation time period based on the selected shoe care course; and
a controller configured to, for a time period corresponding to the operation time period:
perform a synchronous operation mode for controlling the compressor and the fan to operate together, based on receipt of a first signal from the air temperature sensor, wherein the synchronous operation mode includes:
controlling the fan to operate,
controlling the compressor to operate in response to a predetermined first time period having elapsed after a start of operation of the fan, and
controlling the compressor to stop operating based on receipt of a second signal received from the air temperature sensor, the second signal indicating that the temperature of the air is substantially equal to or greater than the target temperature,
control the fan to stop operating in response to a predetermined second time period having elapsed after performing the synchronous operation mode,
perform an asynchronous operation mode for controlling the fan to operate without operating the compressor, wherein the asynchronous operation mode includes controlling the fan to operate for a predetermined third time period based on a third signal received from the refrigerant temperature sensor, and
stop the asynchronous operation mode and resume the synchronous operation mode, based on receipt of the first signal from the air temperature sensor while the asynchronous operation mode is performed.

16. The shoe care apparatus of claim 15, wherein the first signal indicates the temperature of the air to be substantially equal to or less than a predetermined minimum temperature, and the third signal indicates the temperature of the refrigerant to be substantially equal to or less than a predetermined reference temperature.

17. A shoe care apparatus, comprising:
a chamber configured to accommodate shoes;
a heat pump device comprising a condenser configured to heat air supplied to the chamber and a compressor configured to discharge a refrigerant to the condenser;
a fan configured to supply the heated air to the chamber;
an air temperature sensor configured to measure a temperature of the air supplied to the chamber;
a control input device configured to receive an input from a user for selecting a shoe care course among a plurality of shoe care courses, the input corresponding to a target temperature and an operation time period based on the selected shoe care course; and
a controller configured to, for a time period corresponding to the operation time period:
receive an air temperature signal from the air temperature sensor indicating a current air temperature measurement value;
perform a synchronous operation mode wherein the synchronous operation mode includes:
controlling the fan to operate,
controlling the compressor to operate after the fan starts operating,
controlling the compressor to stop operating, and
controlling the fan to stop operating after the compressor stops operating;
based on a comparison of the current air temperature measurement value and the target temperature, stop performance of the synchronous operation mode;
in response to a predetermined time period having elapsed after the compressor stops operating, perform an asynchronous operation mode, wherein the asynchronous operation mode includes controlling the fan to operate without operating the compressor; and
based on a comparison of the current air temperature measurement value and a predetermined minimum temperature value, stop performance of the asynchronous operation mode and resume performance of the synchronous operation mode.

18. The shoe care apparatus of claim 17, further comprising a refrigerant temperature sensor configured to measure a temperature of the refrigerant,
wherein the controller is further configured to:
receive a refrigerant temperature signal from the refrigerant temperature sensor indicating a current refrigerant temperature measurement value; and
based on a comparison of the current refrigerant temperature measurement value and a predetermined reference temperature value, stop performance of the synchronous operation mode and perform the asynchronous operation mode.

19. The shoe care apparatus of claim 1, wherein the control input device is further configured to receive the input from the user for selecting the shoe care course and a type of shoe,
wherein the type of shoe corresponds to the target temperature and a minimum temperature, and the shoe care course corresponds to the operation time period, and
wherein the first signal indicates the temperature of the air to be substantially equal to or less than the minimum temperature.

20. The shoe care apparatus of claim 1, wherein the controller is further configured to:
determine an operation frequency of the compressor based on a predetermined target temperature and an outside air temperature, and
perform the synchronous operation mode for controlling the compressor and the fan to operate together, wherein the synchronous operation mode further includes:
controlling the fan to operate,
controlling the compressor to operate at the operation frequency in response to the predetermined first time period having elapsed after the start of operation of the fan, and controlling the compressor to decrease the operation frequency to a predetermined minimum operation frequency, and to stop operating when the operation frequency reaches the predetermined minimum operation frequency based on the receipt of the second signal from the temperature sensor.

* * * * *